United States Patent
Merrill et al.

(10) Patent No.: US 11,720,527 B2
(45) Date of Patent: *Aug. 8, 2023

(54) API FOR IMPLEMENTING SCORING FUNCTIONS

(71) Applicant: ZestFinance, Inc., Burbank, CA (US)

(72) Inventors: John W. L. Merrill, Redmond, WA (US); John J. Beahan, Pasadena, CA (US)

(73) Assignee: ZestFinance, Inc., Burbank, CA (US)

( * ) Notice: Subject to any disclaimer, the term of this patent is extended or adjusted under 35 U.S.C. 154(b) by 27 days.

This patent is subject to a terminal disclaimer.

(21) Appl. No.: 17/223,698

(22) Filed: Apr. 6, 2021

(65) Prior Publication Data

US 2021/0224227 A1 Jul. 22, 2021

Related U.S. Application Data

(63) Continuation of application No. 16/157,960, filed on Oct. 11, 2018, now Pat. No. 11,010,339, which is a continuation of application No. 14/886,926, filed on Oct. 19, 2015, now Pat. No. 10,127,240.

(60) Provisional application No. 62/065,445, filed on Oct. 17, 2014.

(51) Int. Cl.
*G06F 17/30* (2006.01)
*G06F 16/16* (2019.01)
*G06F 16/2457* (2019.01)
*G06Q 10/067* (2023.01)

(52) U.S. Cl.
CPC ...... *G06F 16/164* (2019.01); *G06F 16/24578* (2019.01); *G06Q 10/067* (2013.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| 525,413 A | 9/1894 | Gates |
| 5,745,654 A | 4/1998 | Titan |
| 5,999,938 A | 12/1999 | Bliss et al. |
| 6,034,314 A | 3/2000 | Koike |

(Continued)

FOREIGN PATENT DOCUMENTS

| WO | 2014014047 A1 | 1/2014 |
| WO | 2014055238 A1 | 4/2014 |

(Continued)

OTHER PUBLICATIONS

Bit Array, Wikipedia Search, May 5, 2021 at https://en.wikipedia.org/wiki/Bit_array.

(Continued)

*Primary Examiner* — Hung D Le
(74) *Attorney, Agent, or Firm* — Troutman Pepper Hamilton Sanders LLP; Christopher J. Forstner; Nicholas J. Gallo

(57) ABSTRACT

This invention relates generally to data assembly and analytics, as can be used in the personal finance and banking field, and more particularly to the field of lending and credit notification methods and systems. Preferred embodiments of the present invention provide systems and methods for creating objects which can be used in multiple implementations to generate scores.

20 Claims, 29 Drawing Sheets

(56) References Cited

U.S. PATENT DOCUMENTS

| | | |
|---|---|---|
| 6,877,656 B1 | 4/2005 | Jaros et al. |
| 7,035,811 B2 | 4/2006 | Gorenstein |
| 7,280,980 B1 | 10/2007 | Hoadley et al. |
| 7,467,116 B2 | 12/2008 | Wang |
| 7,499,919 B2 | 3/2009 | Meyerzon et al. |
| 7,542,993 B2 | 6/2009 | Satterfield et al. |
| 7,610,257 B1 | 10/2009 | Abrahams |
| 7,711,635 B2 | 5/2010 | Steele et al. |
| 7,765,151 B1 | 7/2010 | Williams et al. |
| 7,813,945 B2 | 10/2010 | Bonissone |
| 7,873,535 B2 | 1/2011 | Umblijs et al. |
| 7,873,570 B2 | 1/2011 | Cagan et al. |
| 7,921,359 B2 | 4/2011 | Friebel |
| 7,941,363 B2 | 5/2011 | Tanaka et al. |
| 7,941,425 B2 | 5/2011 | Sahu et al. |
| 7,970,676 B2 | 6/2011 | Feinstein |
| 7,987,177 B2 | 7/2011 | Beyer et al. |
| 7,996,392 B2 | 8/2011 | Liao et al. |
| 8,078,524 B2 | 12/2011 | Crawford et al. |
| 8,086,523 B1 | 12/2011 | Palmer |
| 8,166,000 B2 | 4/2012 | Labrie et al. |
| 8,200,511 B2 | 6/2012 | Zizzamia et al. |
| 8,219,500 B2 | 7/2012 | Galbreath et al. |
| 8,280,805 B1 | 10/2012 | Abrahams |
| 8,335,741 B2 | 12/2012 | Kornegay et al. |
| 8,442,886 B1* | 5/2013 | Haggerty ............... G06Q 40/00 705/38 |
| 8,442,888 B2* | 5/2013 | Hansen ................. G06F 16/248 705/37 |
| 8,452,699 B2 | 5/2013 | Crooks |
| 8,515,842 B2 | 8/2013 | Papadimitriou |
| 8,554,756 B2 | 10/2013 | Gemmell et al. |
| 8,560,436 B2 | 10/2013 | Lau et al. |
| 8,600,966 B2 | 12/2013 | Kravcik |
| 8,626,645 B1 | 1/2014 | Lazerson |
| 8,645,417 B2 | 2/2014 | Groeneveld et al. |
| 8,660,943 B1 | 2/2014 | Chirehdast |
| 8,694,401 B2 | 4/2014 | Stewart |
| 8,744,946 B2 | 6/2014 | Shelton |
| 8,799,150 B2 | 8/2014 | Annappindi |
| 9,047,392 B2 | 6/2015 | Wilkes et al. |
| 9,268,850 B2 | 2/2016 | El-Charif et al. |
| 9,405,835 B2 | 8/2016 | Wheeler et al. |
| 9,501,749 B1 | 11/2016 | Narsky |
| 9,639,805 B1 | 5/2017 | Feller |
| 9,686,863 B2 | 6/2017 | Chung et al. |
| 10,121,115 B2 | 11/2018 | Chrapko |
| 10,581,887 B1 | 3/2020 | Dinerstein |
| 10,684,598 B1 | 6/2020 | Alanqar |
| 10,719,301 B1 | 7/2020 | Dasgupta |
| 10,824,959 B1 | 11/2020 | Chatterjee |
| 10,977,558 B2 | 4/2021 | Herbster |
| 11,296,971 B1 | 4/2022 | Jain |
| 2002/0038277 A1 | 3/2002 | Yuan |
| 2002/0091650 A1 | 7/2002 | Ellis |
| 2002/0138414 A1 | 9/2002 | Baker |
| 2002/0178113 A1 | 11/2002 | Clifford et al. |
| 2003/0009369 A1 | 1/2003 | Gorenstein |
| 2003/0033242 A1 | 2/2003 | Lynch |
| 2003/0033587 A1 | 2/2003 | Ferguson |
| 2003/0046223 A1* | 3/2003 | Crawford ............... G06Q 20/10 705/38 |
| 2003/0101080 A1 | 5/2003 | Zizzamia et al. |
| 2003/0147558 A1 | 8/2003 | Loui |
| 2003/0176931 A1 | 9/2003 | Pednault et al. |
| 2004/0068509 A1 | 4/2004 | Garden et al. |
| 2004/0107161 A1 | 6/2004 | Tanaka et al. |
| 2004/0199456 A1 | 10/2004 | Flint et al. |
| 2005/0055296 A1 | 3/2005 | Hattersley et al. |
| 2005/0114279 A1 | 5/2005 | Scarborough |
| 2005/0234762 A1 | 10/2005 | Pinto |
| 2005/0278246 A1 | 12/2005 | Friedman et al. |
| 2006/0047613 A1 | 3/2006 | Labreuche |
| 2006/0083214 A1 | 4/2006 | Grim, III |
| 2006/0106570 A1 | 5/2006 | Feldman |
| 2006/0112039 A1 | 5/2006 | Wang |
| 2006/0167654 A1 | 7/2006 | Keinan |
| 2006/0200396 A1 | 9/2006 | Satterfield et al. |
| 2006/0218067 A1 | 9/2006 | Steele |
| 2007/0005313 A1 | 1/2007 | Sevastyanov |
| 2007/0011175 A1 | 1/2007 | Langseth |
| 2007/0016542 A1 | 1/2007 | Rosauer et al. |
| 2007/0050286 A1 | 3/2007 | Abrahams |
| 2007/0055619 A1 | 3/2007 | Abrahams |
| 2007/0067284 A1 | 3/2007 | Meyerzon et al. |
| 2007/0106550 A1 | 5/2007 | Umblijs et al. |
| 2007/0112668 A1 | 5/2007 | Celano et al. |
| 2007/0124236 A1 | 5/2007 | Grichnik et al. |
| 2007/0288338 A1 | 12/2007 | Hoadley |
| 2008/0133402 A1 | 6/2008 | Kurian et al. |
| 2008/0208820 A1 | 8/2008 | Usey et al. |
| 2008/0222061 A1 | 9/2008 | Soetjahja |
| 2008/0306893 A1 | 12/2008 | Saidi |
| 2008/0307006 A1 | 12/2008 | Lee |
| 2009/0006283 A1 | 1/2009 | Labrie et al. |
| 2009/0006356 A1* | 1/2009 | Liao ...................... G06F 16/335 707/999.005 |
| 2009/0015433 A1* | 1/2009 | James .................... G08C 23/04 340/12.22 |
| 2009/0024517 A1 | 1/2009 | Crooks |
| 2009/0030888 A1 | 1/2009 | Sahu et al. |
| 2009/0037308 A1 | 2/2009 | Feinstein |
| 2009/0192980 A1 | 7/2009 | Beyer et al. |
| 2009/0216748 A1 | 8/2009 | Kravcik |
| 2009/0254572 A1 | 10/2009 | Redlich |
| 2009/0299911 A1 | 12/2009 | Abrahams |
| 2009/0319521 A1 | 12/2009 | Groeneveld et al. |
| 2010/0005018 A1 | 1/2010 | Tidwell |
| 2010/0010878 A1 | 1/2010 | Pinto et al. |
| 2010/0010935 A1 | 1/2010 | Shelton |
| 2010/0082476 A1 | 4/2010 | Bowman |
| 2010/0257459 A1 | 10/2010 | Galbreath et al. |
| 2010/0325067 A1 | 12/2010 | Cagan et al. |
| 2011/0071969 A1 | 3/2011 | Doctor |
| 2011/0078073 A1 | 3/2011 | Annappindi |
| 2011/0112957 A1 | 5/2011 | Ingram et al. |
| 2011/0161263 A1 | 6/2011 | Lee |
| 2011/0173116 A1 | 7/2011 | Yan et al. |
| 2011/0178902 A1 | 7/2011 | Imrey |
| 2011/0184941 A1* | 7/2011 | El-Charif .......... G06F 16/24578 707/723 |
| 2011/0320423 A1 | 12/2011 | Gemmell et al. |
| 2012/0053951 A1 | 3/2012 | Kowalchuk et al. |
| 2012/0059819 A1* | 3/2012 | Wheeler ............... G06F 16/248 707/E17.084 |
| 2012/0066106 A1 | 3/2012 | Papadimitriou |
| 2012/0066116 A1 | 3/2012 | Kornegay et al. |
| 2012/0072029 A1 | 3/2012 | Persaud et al. |
| 2012/0082476 A1 | 4/2012 | Ito et al. |
| 2012/0239613 A1 | 9/2012 | Danciu et al. |
| 2013/0091050 A1 | 4/2013 | Merrill |
| 2013/0103569 A1 | 4/2013 | Gopinathan et al. |
| 2013/0138553 A1 | 5/2013 | Nikankin et al. |
| 2013/0185189 A1 | 7/2013 | Stewart |
| 2014/0012794 A1 | 1/2014 | Dillon |
| 2014/0014047 A1 | 1/2014 | Garcia et al. |
| 2014/0025872 A1 | 1/2014 | Flynn |
| 2014/0052604 A9 | 2/2014 | Stewart |
| 2014/0081832 A1 | 3/2014 | Merrill et al. |
| 2014/0108665 A1 | 4/2014 | Arora |
| 2014/0122355 A1* | 5/2014 | Hardtke ............. G06Q 10/1053 705/321 |
| 2014/0149177 A1 | 5/2014 | Frank |
| 2014/0172886 A1 | 6/2014 | Wilkes et al. |
| 2014/0180790 A1 | 6/2014 | Boal |
| 2014/0181267 A1 | 6/2014 | Wadkins |
| 2014/0310661 A1 | 10/2014 | Frederickson |
| 2014/0310681 A1 | 10/2014 | Poozhiyil |
| 2015/0019912 A1 | 1/2015 | Darling |
| 2015/0056229 A1 | 2/2015 | Nandy et al. |
| 2015/0081602 A1 | 3/2015 | Talley |
| 2015/0161098 A1 | 6/2015 | Granshaw |
| 2015/0213361 A1 | 7/2015 | Gamon |
| 2015/0317337 A1 | 11/2015 | Edgar |

(56) References Cited

U.S. PATENT DOCUMENTS

| | | |
|---|---|---|
| 2015/0347485 A1 | 12/2015 | Cai |
| 2015/0379428 A1 | 12/2015 | Dirac |
| 2016/0042292 A1 | 2/2016 | Caplan |
| 2016/0088723 A1* | 3/2016 | Chung ............... H05K 1/144 361/803 |
| 2016/0110353 A1 | 4/2016 | Merrill |
| 2016/0132787 A1 | 5/2016 | Drevo |
| 2016/0300252 A1 | 10/2016 | Frank |
| 2016/0371238 A1 | 12/2016 | Heavenrich |
| 2017/0061326 A1 | 3/2017 | Talathi |
| 2017/0109657 A1 | 4/2017 | Marcu |
| 2017/0124464 A1 | 5/2017 | Crabtree |
| 2017/0140518 A1 | 5/2017 | Liang |
| 2017/0220633 A1 | 8/2017 | Porath |
| 2017/0222960 A1 | 8/2017 | Agarwal |
| 2017/0316311 A1 | 11/2017 | Pilly |
| 2017/0330058 A1 | 11/2017 | Silberman |
| 2018/0018578 A1 | 1/2018 | Yoshizumi |
| 2018/0025273 A1 | 1/2018 | Jordan |
| 2018/0060738 A1 | 3/2018 | Achin |
| 2018/0068219 A1 | 3/2018 | Turner |
| 2018/0268262 A1 | 9/2018 | Osada |
| 2018/0293712 A1 | 10/2018 | Vogels |
| 2018/0322406 A1 | 11/2018 | Merrill |
| 2018/0349986 A1 | 12/2018 | Fidanza |
| 2019/0042887 A1 | 2/2019 | Nguyen |
| 2019/0043070 A1 | 2/2019 | Merrill |
| 2019/0114704 A1 | 4/2019 | Way |
| 2019/0228006 A1 | 7/2019 | Tormasov |
| 2019/0244122 A1 | 8/2019 | Li |
| 2019/0279111 A1 | 9/2019 | Merrill |
| 2019/0287025 A1 | 9/2019 | Perez |
| 2019/0303404 A1 | 10/2019 | Amer |
| 2019/0311298 A1 | 10/2019 | Kopp |
| 2019/0318202 A1 | 10/2019 | Zhao |
| 2019/0318421 A1 | 10/2019 | Lyonnet |
| 2019/0325514 A1 | 10/2019 | Hong |
| 2019/0340518 A1 | 11/2019 | Merrill |
| 2019/0340684 A1 | 11/2019 | Belanger |
| 2019/0354806 A1 | 11/2019 | Chhabra |
| 2019/0354853 A1 | 11/2019 | Zoldi |
| 2019/0378210 A1 | 12/2019 | Merrill |
| 2020/0005136 A1 | 1/2020 | Spryn |
| 2020/0012917 A1 | 1/2020 | Pham |
| 2020/0082299 A1 | 3/2020 | Vasconcelos |
| 2020/0160177 A1 | 5/2020 | Durand |
| 2020/0175586 A1 | 6/2020 | McKenna |
| 2020/0183047 A1 | 6/2020 | Denli |
| 2020/0231466 A1 | 7/2020 | Lu |
| 2020/0242492 A1 | 7/2020 | Goel |
| 2020/0257927 A1 | 8/2020 | Nomi |
| 2020/0257961 A1 | 8/2020 | Hua |
| 2021/0019603 A1 | 1/2021 | Friedman |
| 2021/0133631 A1 | 5/2021 | Prendki |
| 2021/0209688 A1 | 7/2021 | Krishnamurthy |
| 2021/0224605 A1 | 7/2021 | Zhang |
| 2021/0256392 A1 | 8/2021 | Chen |
| 2021/0281491 A1 | 9/2021 | Yelahanka Raghuprasad |
| 2021/0406815 A1 | 12/2021 | Mimassi |
| 2022/0019741 A1 | 1/2022 | Roy |
| 2022/0122171 A1 | 4/2022 | Hubard |
| 2022/0188519 A1 | 6/2022 | Briody |
| 2022/0188568 A1 | 6/2022 | Singh |
| 2022/0191332 A1 | 6/2022 | Ahmadi |

FOREIGN PATENT DOCUMENTS

| | | | |
|---|---|---|---|
| WO | 2014121019 | A1 | 8/2014 |
| WO | 2014184381 | A2 | 11/2014 |
| WO | 2015056229 | A1 | 4/2015 |
| WO | 2015081160 | A1 | 6/2015 |
| WO | 2019028179 | A1 | 2/2019 |

OTHER PUBLICATIONS

Genetic algorithm, Wikipedia Search, May 5, 2021 at https://en.wikipedia.org/wiki/Gentic_algorithm.

International Search Report and the Written Opinion, Application No. PCT/US14/014047, dated May 5, 2014.

"On the Convergence of Generalized Hill Climbing Algorithms" by A.W. Johnson et al. copyright 2002, Elsevier Science B.V., Discrete Applied Mathematics (Year: 2002).

"International Search Report and Written Opinion of the ISA, dated Sep. 16, 2019, for application No. PCT/US19/029148."

Abadi, Martin, et al., "TensorFlow: Large-Scale Machine Learning on Heterogeneous Distributed Systems", Preliminary White Paper, Nov. 9, 2015.

Breiman, Leo, et al., "Random Forests", Machine Learning, 45, 5-32, 2001.

Chen, Jiahao, Fair lending needs explainable models for responsible recommendation Proceedings of the Second Workshop on Responsible Recommendation, 2018 (Year: 2018).

Chen, Tianqi, et al., "XGBoost: A Scalable Tree Boosting System", KDD '16, Aug. 13-17, 2016, San Francisco, CA, USA.

Cortes, Corinna, et al., "Support-Vector Networks", AT&T Labs-Research, USA, Journal Machine Learning, vol. 20, Issue 3, Sep. 1995.

Data Bias and Algorithmic Discrimination University of Montreal, 2017 (Year: 2017).

Demaine, Erik D., et al., "Correlation clustering in general weighted graphs", Theorectical Computer Science 361 2006)172-187.

Friedman, Jerome H., "Greedy Function Approximation: A Gradient Boosting Machine", IMS 1999 Reitz Lecture, Feb. 24, 1999.

Garcia-Pedradas, Nicolas, et al., "Nonlinear Boosting Projections for Ensemble Contruction", Journal of Machine Learning Research 8 (2007) 1-33.

Gates, Susan Wharton et al., 4/3 Automated Underwriting: Friend or Foe to Low-Mod Households and Neighborhoods? Building Assets, Building Credit, Symposium, Nov. 2003 (Year: 2003).

Geurts, Pierre, et al., "Extremely randomized trees", Springer Science + Business Media, Inc., pub. online Mar. 2, 2006.

International Preliminary Report on Patentability issued in PCT/US2013/060208, dated Mar. 24, 2015, 8 pages.

International Search Report and Written Opinion for Application No. PCT/US18/44874, dated Oct. 10, 2018.

International Search Report and Written Opinion for application No. PCT/US20/062235, dated Mar. 10, 2021.

International Search Report and Written Opinion for application No. PCT/US20/062271 dated Feb. 26, 2021.

International Search Report and Written Opinion for International Application No. PCT/US18/030966, dated Jul. 20, 2018.

International Search Report and Written Opinion issued in PCT/US2020/062235, dated Mar. 10, 2021, 8 pages.

International Search Report and Written Opinion issued in PCT/US2020/062271, dated Feb. 26, 2021, 8 pages.

International Search Report and Written Opinion of the ISA for application No. PCT/20/23370 dated Jun. 18, 2020.

International Search Report and Written Opinion of the ISA, dated Jul. 5, 2019, for application No. PCT/US19/021381.

International Search Report and Written Opinion of the ISA, dated Aug. 23, 2019, for application No. PCT/US19/036049.

International Search Report issued in PCT/US2013/060208, dated Jan. 7, 2014, 2 pages.

Ivanov, Alexei, et al., "Kolmogorov-Smirnov test for feature selection in emotion recognition from speech", IEEE International Conference on acoustics, speech and signal processing (ICASSP), 2012, pp. 5125-5128.

Johnson, Kristen, et al., "Artificial Intelligence, Machine Learning, and Bias in Finance: Toward Responsible Innovation", Fordham Law Review, Volume **, Issue 2, Article 5, 2019, pp. 499-529.

Kamkar, Sean Javad, "Mesh Adaption Strategies for Vortex-Dominated Flows", Standard University, Feb. 2011.

Lippert, John, "ZestFinance Issues small, high-rate loans, uses big data to weed out deadbeats", The Washington Post, Oct. 12, 2014.

Louppe, Gilles, et al., "Learning to Pivot with Adversarial Networks", 31st Conference on Neural Information Processing Systems

(56) References Cited

OTHER PUBLICATIONS (NIPS 2017), Long Beach, CA, USA, https://papers.nips.cc/paper/6699-learning-to-pivot-with-adversarial-networks.pdf.

Lundberg, Scott M., et al., "A Unified Approach to Interpreting Model Predictions", 31st Conference on Neural Information Processing Systems (NIPS 2017), Long Beach, CA, USA, Nov. 25, 2017.

Lundberg, Scott M., et al., "Consistent Individualized Feature Attribution for Tree Ensembles", University of Washington, Mar. 7, 2019.

Merrill, Douglas C, et al., "Systems and Methods for Decomposition of Non-Differentiable and Differentiable Models", U.S. Appl. No. 16/434,731, filed Jun. 7, 2019.

Merrill, Douglas C, et al., "Systems and Methods for Enriching Modeling Tools and Infrastructure with Semantics", U.S. Appl. No. 16/394,651, filed Apr. 25, 2019.

Modarres, Ceena, et al., "Towards Explainable Deep Learning for Credit Lending: A Case Study", arXiv:1811.06471v2 [cs.LG], Nov. 30, 2018.

Mondarres, Ceena et al., Towards Explainable Deep Learning for Credit Lending: A Case Study Proc. Workshop Challenges Opportunities AI Financial Services: Impact Fairness Explainability Accuracy Privacy (NIPS), 2018 (Year: 2018).

Nesiba, Reynold F., "The Color of Credit: Mortgage Discrimination, Research Methodology, and Fair-Lending Enforcement", Journal of Economic Issues, 37 (3), 813-815, 2003.

Office Action (Final Rejection) dated Nov. 18, 2021 for U.S. Appl. No. 16/052,293 (pp. 1-18).

Office Action (Final Rejection) dated Dec. 7, 2021 for U.S. Appl. No. 16/109,545 (pp. 1-17).

Office Action (Non-Final Rejection) dated Dec. 16, 2021 for U.S. Appl. No. 15/977,105 (pp. 1-19).

Office Action (Notice of Allowance and Fees Due (PTOL-85)) dated Nov. 19, 2021 for U.S. Appl. No. 16/292,844 (pp. 1-8).

Ribeiro, Marco Tulio et al., Why Should I Trust You?—Explaining Predictions of Any Classifier ACM, 2016 (Year: 2016).

Richardson, L. F., "The approximate arithmetical solution by finite differences of physical problems including differential equations, with an application to the stresses in a masonry dam", Philosophical Transactions of the Royal Society A. 210 (459-470): 307-357. doi:10.1098/rsta.1911.0009, Nov. 2, 1909.

Richardson, L. F., "The deferred approach to the limit", Philosophical Transactions of the Royal Society A. 226 (636-646): 299-349. doi:10.1098/rsta.1927.0008, Oct. 14, 1926.

Rumelhart, David E., et al., "Learning representations by backpropagating errors", Nature vol. 323, Oct. 9, 1986.

Saabas, Ando, "Diving into data, a blog on machine learning, data mining and visualization, Interpreting random forests", http://blog.datadive.net/interpreting-random-forests/ (spec), Oct. 19, 2014.

Saabas, Ando, "Diving into data, a blog on machine learning, data mining and visualization, Random forest interpretation with scikit-learn", http://blog.datadive.net/random-forest-interpretation-with-scikit-learn/ (spec), Aug. 12, 2015.

Saabas, Ando, "Diving into data, a blog on machine learning, data mining and visualization, Random forest interpretation—conditional feature contributions", http://blog.datadive.net/random-forest-interpretation-conditional-feature-contributions/ (spec), Oct. 26, 2016.

Shapley, L. S., "A Value for n-Person Games", p. 295, The Rand Corporation,Mar. 18, 1952.

Strumbelj, Eric, et al., "An Efficient Explanation of Individual Classifications using Game Theory", Journal of Machine Learning Research 11 (2010) 1-18.

Sundararajan, Mukund, et al., "Axiomatic Attribution for Deep Networks", Proceeding of the 34th International Conference on Machine Learning, Sydney, Australia, PMLR 70, Jun. 13, 2017.

Tonk, Stijn, "Towards fairness in ML with adversarial networks", http://godatadriven.com/, Apr. 27, 2019.

Wattenber, Martin et al., Attacking discrimination with smarter machine learning Google Research, 2016 (Year: 2016).

Wolpert, David H., "Stacked Generalization", Original contribution: Stacked generalization. Neural Netw., 5(2):241 259, Feb. 1992.

ZestFinance releases new software tool to reduce bias in AI-powered credit scoring models: New fairness filter can put 170,000 more minority families into homes. (Mar. 19, 2019). PR Newswire Retrieved from https://dialog.proquest.com/professional/docview/2193594346?accountid=131444 (Year: 2019).

Zhang, et al., 2018. "Mitigating Unwanted Biases with Adversarial Learning," In Proceedings of the 2018 AAAI/ACM Conference on AI, Ethics, and Society (AIES '18). Association for Computing Machinery, New York, NY, USA, 335-340.

Zhao, Zheng, et al., "On Similarity Preserving Feature Selection", IEEE Transactions on Knowledge and Data Engineering 25,2011, pp. 619-632.

Office Action (Non-Final Rejection) dated Mar. 2, 2022 for U.S. Appl. No. 16/434,731 (pp. 1-6).

Boris Sharchilev et al: "Finding Influential Training Samples for Gradient Boosted Decision Trees", arxiv.org, Cornell University Library, 201 Olin Library Cornell University Ithaca, NY 14853, Feb. 19, 2018 (Feb. 19, 2018), XP081223129.

European Extended Search Report issued in EP19764112.9, dated Jun. 27, 2022, 11 pages.

European Extended Search Report issued in EP19764112.9, dated Mar. 24, 2022, 14 pages.

Kang et al., "A novel credit scoring framework for auto loan using an imbalanced-learning-based reject inference". 2019 IEEE Conference on Computational Intelligence for Financial Engineering & Economics (CIFEr). May 4-5, 2019. DOI: 10.1109/CIFEr 2019.8759110 (Year: 2019).

Marco Ancona et al: "Towards better understanding of gradient-based attribution methods for Deep Neural Networks", arxiv.org, Cornell University Library, 201 Olin Library Cornell University Ithaca, NY 14853, Mar. 7, 2018 (Mar. 7, 2018), XP081506780.

Mukund Sundararajan et al: "Axiomatic Attribution for Deep Networks", arxiv.org, Cornell University Library, 201 Olin Library Cornell University Ithaca, NY 14853, Mar. 4, 2017 (Mar. 4, 2017), XP080754192.

Office Action (Non-Final Rejection) dated May 24, 2022 for U.S. Appl. No. 16/688,789 (pp. 1-17).

Office Action (Non-Final Rejection) dated Jun. 24, 2022 for U.S. Appl. No. 17/385,452 (pp. 1-14).

Wikipedia entry on "Autoencoder". https://en.wikipedia.org/wiki/Autoencoder Downloaded Jun. 15, 2022 (Year: 2022).

"Feature Selection", Wikipedia and obtained in the Wayback machine at URL https://en.wikipedia.org/wiki/Feature_selection, Feb. 25, 2021.

Gehrlein, William et al., "A two-stage least cost credit scoring model", 1997, Annals of Operations Research, pp. 159-171, Jul. 15, 2016 00:00:00.0.

Bittencourt, H.R., et al., "Feature Selection by Using Classification and Regression Trees (CART)", dated Mar. 23, 2004.

Strobl, Carolin, et al., "Conditional Variable Importance for Random Forests", BMC Bioinformatics 2008, 9:307, published Jul. 11, 2008.

Tuv, Eugene, et al., "Feature Selection with Ensembles, Artificial Variables, and Redundancy Elimination", Journal of Machine Learning Research, pp. 1341-1366, Jul. 2009.

"Feature Selection", Wikipedia and obtained in the Wayback machine at URL http://en.wikipedia.org/wiki/Feature_selection, Sep. 1, 2011.

International Preliminary Report on Patentability dated Aug. 4, 2015 in corresponding PCT Application No. PCT/US2014/014047.

International Search Report dated May 5, 2014 in corresponding PCT Application No. PCT/US2014/014047.

Merrill, John W. L., et al., "Generalized Integrated Gradients: A practical method for explaining diverse ensembles", Journal of Machine Learning Research Under Review (2019), 29 pages.

Ward, et al., "An exploration of the influence of path choice in game-theoretic attribuution algorithms," Journal of Machine Learning Research Under Review (2020), 21 pages.

Dong Yue et al, "Threaded ensembles of autoencoders for stream learning : Neural Networks for Stream Learning", Computational Intelligence, vol. 34, No. 1, doi:10.1111/coin.12146, ISSN 0824-

(56) References Cited

OTHER PUBLICATIONS 7935, (Feb. 1, 2018), pp. 261-281, URL: https://api.wiley.com/onlinelibrary/tdm/v1/articles/10.1111%2Fcoin.12146, XP055925516 (Absract).

European Extended Search Report issued in EP19796824.1, dated Jun. 13, 2022, 9 pages.

International Preliminary Report on Patentability in International Appln. No. PCT/US2019/029148, dated Nov. 19, 2020, 6 pages.

Li, Hongxiang, et al. "A novel method for credit scoring based on feature transformation and ensemble model." PeerJ Computer Science 7 (2021): e579. 19 pages.

Office Action (Final Rejection) dated Dec. 7, 2022 for U.S. Appl. No. 16/688,789 (pp. 1-24).

Office Action (Non-Final Rejection) dated Oct. 28, 2022 for U.S. Appl. No. 17/389,789 (pp. 1-19).

Office Action (Non-Final Rejection) dated Dec. 8, 2022 for U.S. Appl. No. 17/147,025 (pp. 1-20).

Wei Min et al, "Behavior Language Processing with Graph based Feature Generation for Fraud Detection in Online Lending Behavior Language Processing with Graph based Feature Generation for Fraud Detection in Online Lending", Proceedings of WSDM workshop on Misinformation and Misbehavior Mining on the Web, (Jan. 1, 2018), URL: https://web.archive.org/web/20180329125033if_/http://snap.stanford.edu:80/mis2/files/MIS2_paper_26.pdf, (Aug. 7, 2019), XP055611538, 8 pages.

Sean, D.M., Wu, H., Igbal, E., Dzahini, O., Ibrahim, Z.M., Broadbent, M., Stewart, R. and Dobson, R.J., 2017. Knowledge graph prediction of unknown adverse drug reactions and validation in electronic health records. Scientific reports, 7(1), pp. 1-11.

Office Action (Final Rejection) dated Aug. 16, 2022 for U.S. Appl. No. 15/977,105 (pp. 1-17).

Office Action (Non-Final Rejection) dated Aug. 1, 2022 for U.S. Appl. No. 16/052,293 (pp. 1-15).

Office Action (Non-Final Rejection) dated Aug. 26, 2022 for U.S. Appl. No. 16/394,651 (pp. 1-8).

Office Action (Non-Final Rejection) dated Sep. 15, 2022 for U.S. Appl. No. 17/535,511 (pp. 1-11).

Zhao, Q., Li, Q. and Wen, J., 2018. Construction and application research of knowledge graph in aviation risk field. In MATEC Web of Conferences (vol. 151, p. 05003). EDP Sciences.

* cited by examiner

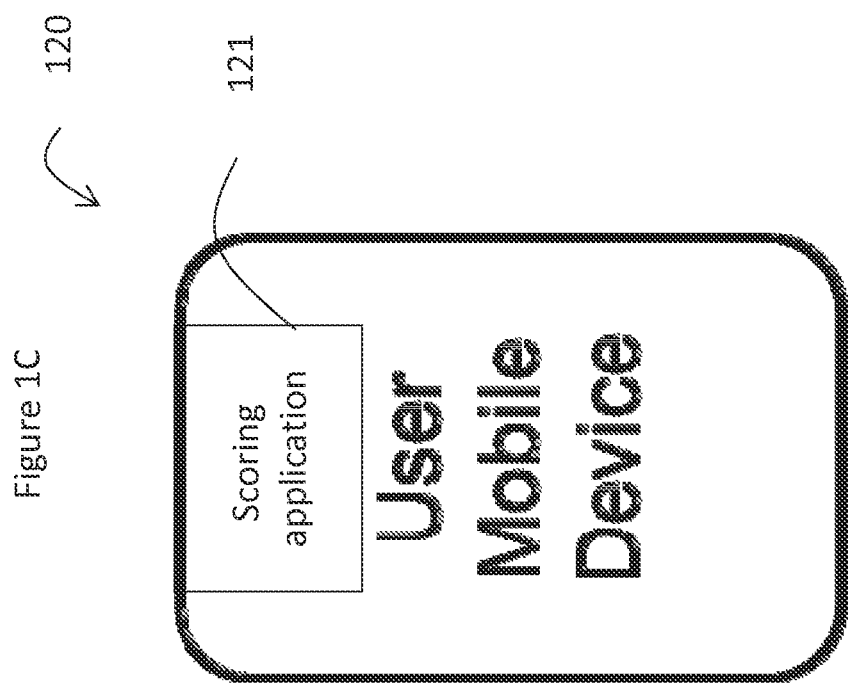

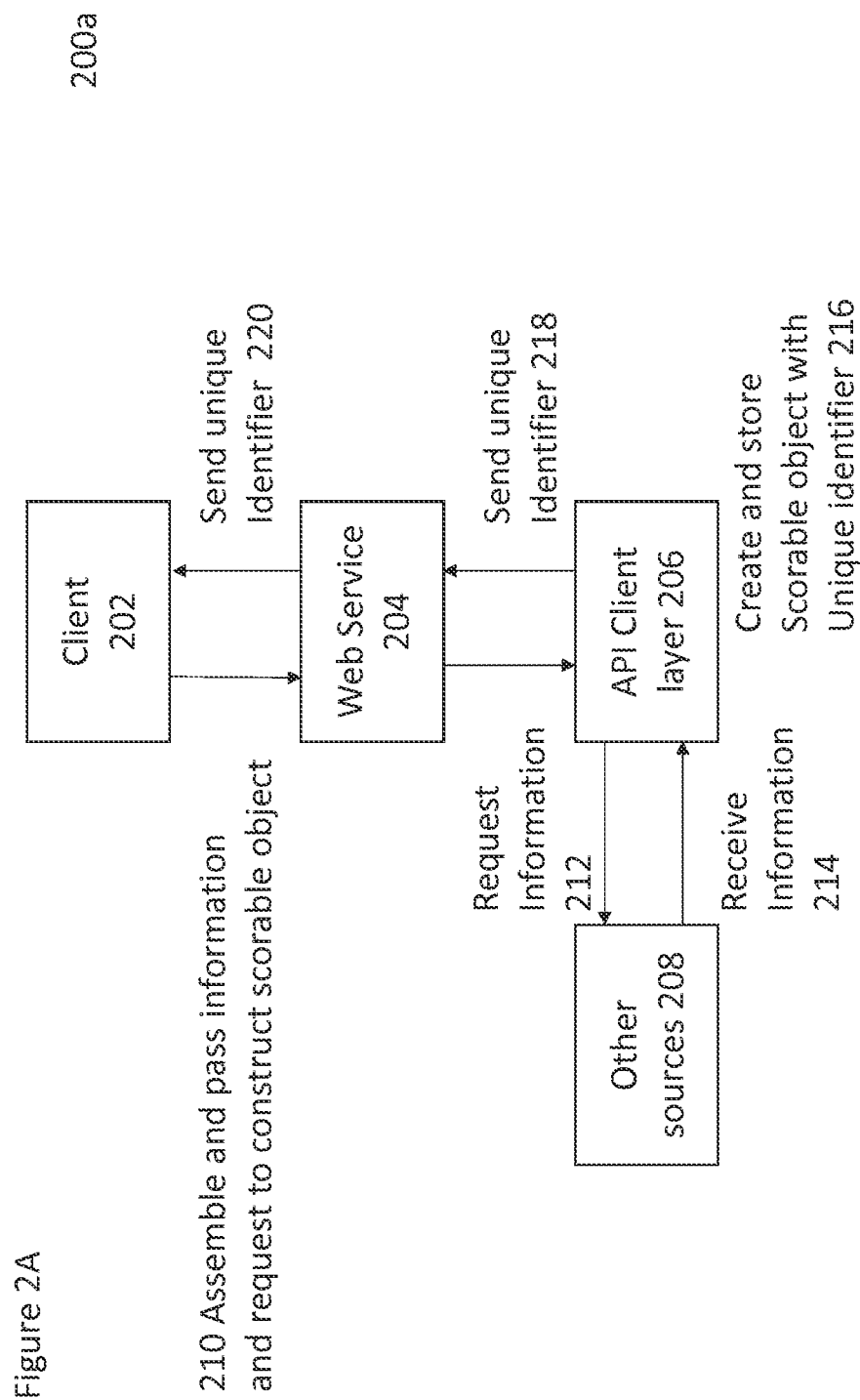

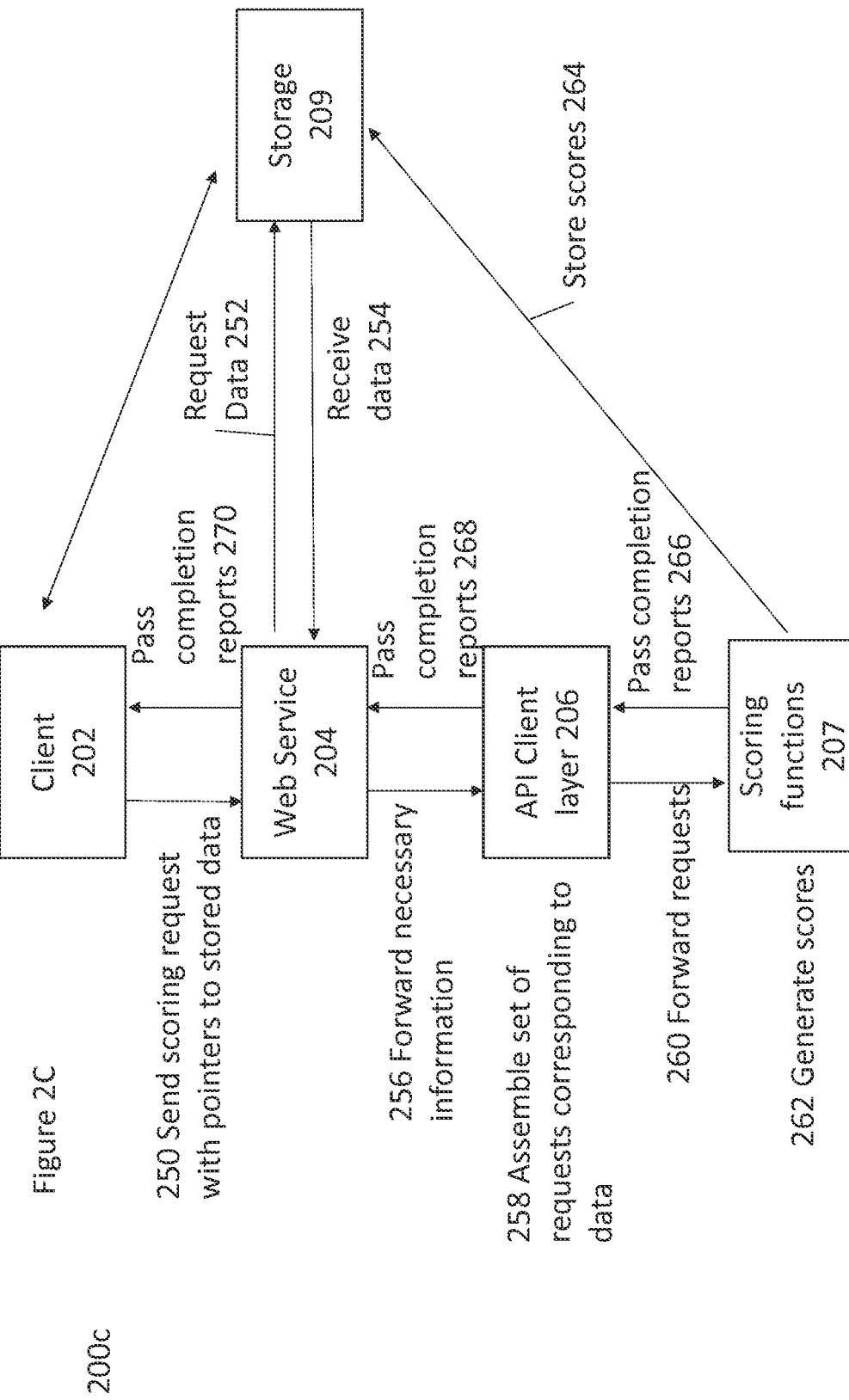

Figure 3B

Input applicant information:

- First name
- Last name
- Address line 1
- Address line 2
- City | State | Zip

Time lived at residence:
| Yrs ▼

310
312
314 Next

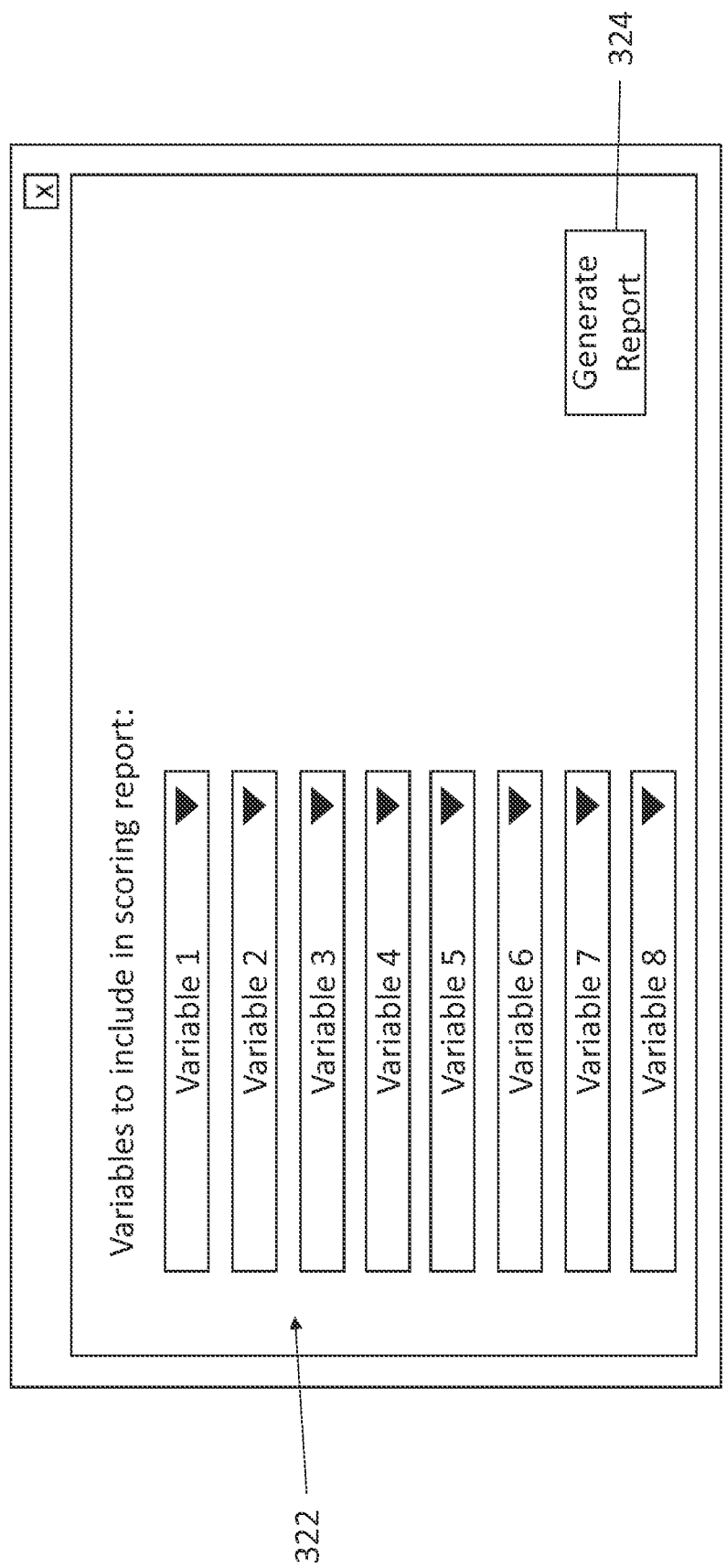

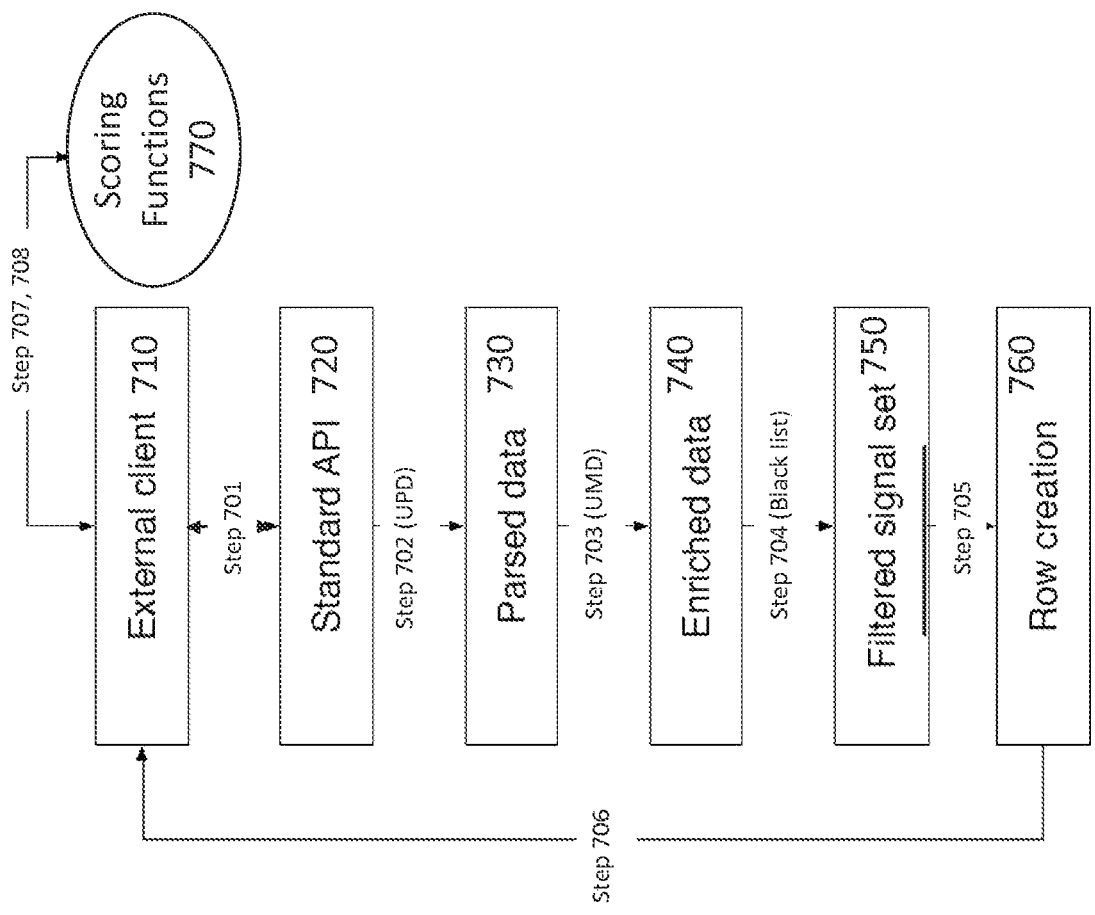

API FOR IMPLEMENTING SCORING FUNCTIONS

CROSS-REFERENCE TO RELATED APPLICATIONS

This application is a continuation of U.S. application Ser. No. 16/157,960, filed 11 Oct. 2018, which is a continuation of U.S. application Ser. No. 14/886,926, filed 19 Oct. 2015, which claims priority to U.S. Provisional Application No. 62/065,445, 17 Oct. 2014, each of which are hereby incorporated in their entirety by reference. This application also relates to U.S. application Ser. No. 13/454,970, entitled "SYSTEM AND METHOD FOR PROVIDING CREDIT TO UNDERSERVED BORROWERS" filed Apr. 24, 2012; U.S. application Ser. No. 14/169,400 entitled "METHODS AND SYSTEMS FOR AUTOMATICALLY GENERATING HIGH QUALITY ADVERSE ACTION NOTIFICATIONS" filed Jan. 31, 2014; U.S. application Ser. No. 14/276,632 entitled "SYSTEM AND METHOD FOR BUILDING AND VALIDATING A CREDIT SCORING FUNCTION" filed May 13, 2014; U.S. application Ser. No. 13/622,260 entitled "SYSTEM AND METHOD FOR BUILDING AND VALIDATING A CREDIT SCORING FUNCTION" filed Sep. 18, 2012 and U.S. Provisional Application 62/187,748 entitled "METHODS AND SYSTEMS FOR DATA COERCION" filed Jul. 1, 2015 which applications are also hereby incorporated in their entirety by reference.

FIELD OF THE INVENTION

The field of the invention relates to applying a computer implemented a scoring function to a series of variables in a computer system.

BACKGROUND OF THE INVENTION

When a loan application is presented to a lender, the lender decides whether to fund the loan or not. In modern lending systems, this is done by taking data in the loan application, possibly aggregating it with external data from other data sources, and then applying a scoring function to the data to generate a score. Typically, the lender will fund the loan only if the generated score exceeds a certain threshold. Except in extraordinary cases, a computer program located either locally or remotely performs the scoring operation. Similarly, when a collections agent wishes to prioritize defaulted loans upon which they intend to act, they can apply one or more scoring functions to the defaulted loans to generate a score or scores, and perform one or more collection actions to encourage payment based on a prioritization from the generated score or scores. Similarly, when a marketer wishes to determine how best to execute a marketing campaign through one or more media, the marketer can collect data related to all possible targets of the marketing campaign and rank them by applying a scoring function. This helps to optimize the performance of the campaign for the amount of money spent. All of these applications are homologous: an individual or entity wants to make a decision for one or more business items, so the individual or entity passes information through a scoring function that generates one or more scores. The generated score or scores are then used in making the decision for the one or more business items or prioritize actions.

In general, two groups collaborate to develop these scoring functions, a group of modelers (often referred to as underwriters or other names in different contexts), and a group of programmers (often referred to as software engineers, developers, or similar names.) The modelers, working in a domain-specific language (DSL) or system such as SAS, SPSS, Stata, R, S-plus, MatLab or others, may build a prototype implementation of the scoring function. This prototype can then be given to the programmers, who reimplement the prototype in a general purpose language (GP language) such as C, FORTRAN, Ruby, or C++, before incorporating the implementation into a larger system that delivers scores.

This method of implementation has a number of drawbacks. First, it can require a long period of time to deploy a scoring function, since the reimplementation process is delicate and difficult.

Additionally, the resulting scoring function is relatively difficult to test because tests typically need to be reimplemented in the GP language.

Additionally, DSL's often incorporate algorithms that make the mathematical operations used in the scoring function more stable or accurate. Most GP languages do not include such algorithms, as they make a minor contribution to the uses for which the GP languages are normally applied. Even in cases where programmers have access to tools that implement special purpose algorithms, it can be essentially impossible to guarantee that in all cases the results in the larger embedded system match the results in the prototype scoring function.

Additionally, scoring functions can return unexpected results for reasonable inputs and thus fail to accurately compute solutions. In such cases a final diagnosis of the nature of the failure and its appropriate fix should fall to the group of modelers. If the prototype has been reimplemented, few if any of members of the modeling team will have the sophistication to diagnose any problems with the reimplemented prototype.

Additionally, systems that solve qualitatively different problems (underwriting versus collections versus marketing) will typically have separate implementations. This introduces additional problems, ranging from a lack of shared context (such as the environment the code was written in, including the tools used to write the code and the members of the team who wrote the code) among different programmers, to a lack of common testing infrastructure, even causing potential political strains within an organization due to replication of roles among different units.

By removing the reimplementation process, the drawbacks listed above can be resolved. If an API between the presentation layer and the scoring layer is suitably designed, introducing or upgrading a scoring function can be trivial, since the scoring layer can be easily replaced (if it is a discrete component of the scoring system) or the scoring system can be stopped and restarted with a new scoring function in place. Modelers can debug the implementation of the scoring function, as they wrote it and are therefore familiar with the implementation language and code. Since the scoring function runs in the DSL itself, the scoring function will continue to use any of the special computational or algorithmic features described above.

The division of the main API into two layers makes the process of building a client for a given system more straightforward and reproducible, particularly since many of the interactions between the kernel and the client level are human readable and can thus be read by non-coders. This exposes most of the internal structure of the client layer in an easy to understand medium, making it easier to share knowledge among and between developers and teams, reducing the cost of building new client layers, and thus reducing costs overall.

BRIEF DESCRIPTION OF THE DRAWING(S)

Illustrated in the accompanying drawing(s) is at least one of the best mode embodiments of the present invention In such drawing(s):

FIG. 1C is an example view of a user device according to an embodiment of the present invention.

FIGS. 2A-2C are example views of flow chart diagram showing system interaction according to an embodiment of the present invention.

FIGS. 3A-3C are example views of user interface screens according to an embodiment of the present invention.

FIG. 7 shows an example embodiment of a functional API structure in accordance with the present invention.

DETAILED DESCRIPTION OF PREFERRED EMBODIMENTS

The following description of the preferred embodiments of the invention is not intended to limit the invention to these preferred embodiments, but rather to enable any person skilled in the art to make and use this invention. Although any methods, materials, and devices similar or equivalent to those described herein can be used in the practice or testing of embodiments, the preferred methods, materials, and devices are now described.

The present invention relates to improved methods and systems for replacement of the above described monolithic approach of re-implementing a prototype in a different language for different applications. Herein is described a multipartite approach in which prototype code can be directly incorporated into a production system. This multipartite system can incorporate an outer presentation layer that duplicates the behavior of the previous approach and an inner scoring layer built from a prototype originally written by a modeling team. These two layers can communicate with one another through a prescribed application programming interface (API) that can be implemented within a single encapsulated unit of execution (a process), between two applications on a single processing system (using an "inter-process communication system"), or between or among applications running on different processing systems (using a "remote communication system").

In the described system, the scoring layer can be a composite of two layers, a client interface and a kernel. Qualitatively different applications typically use different client layers, but all client layers can share a single kernel. In this model, a batch scoring system that can be applied naturally to a marketing problem can have a first client layer, while a real-time scoring system that can be naturally applied to loan underwriting can have a second client layer. In an example embodiment of this system, one or more client layers can interact with the kernel layer through a single common interface and the one or more client layers can expose the API described above, for instance by enabling objects to be accessed through different means. In order to provide as much common structure as possible, the client layer and the kernel can communicate through an internal API which consists of a set of down-calls from the client layer to the kernel, a set of callbacks by which the kernel extracts information about any input data from the client layer, and a set of human-readable and human-editable files which describe how the callbacks operate and what the callbacks depend upon.

Figure 4:
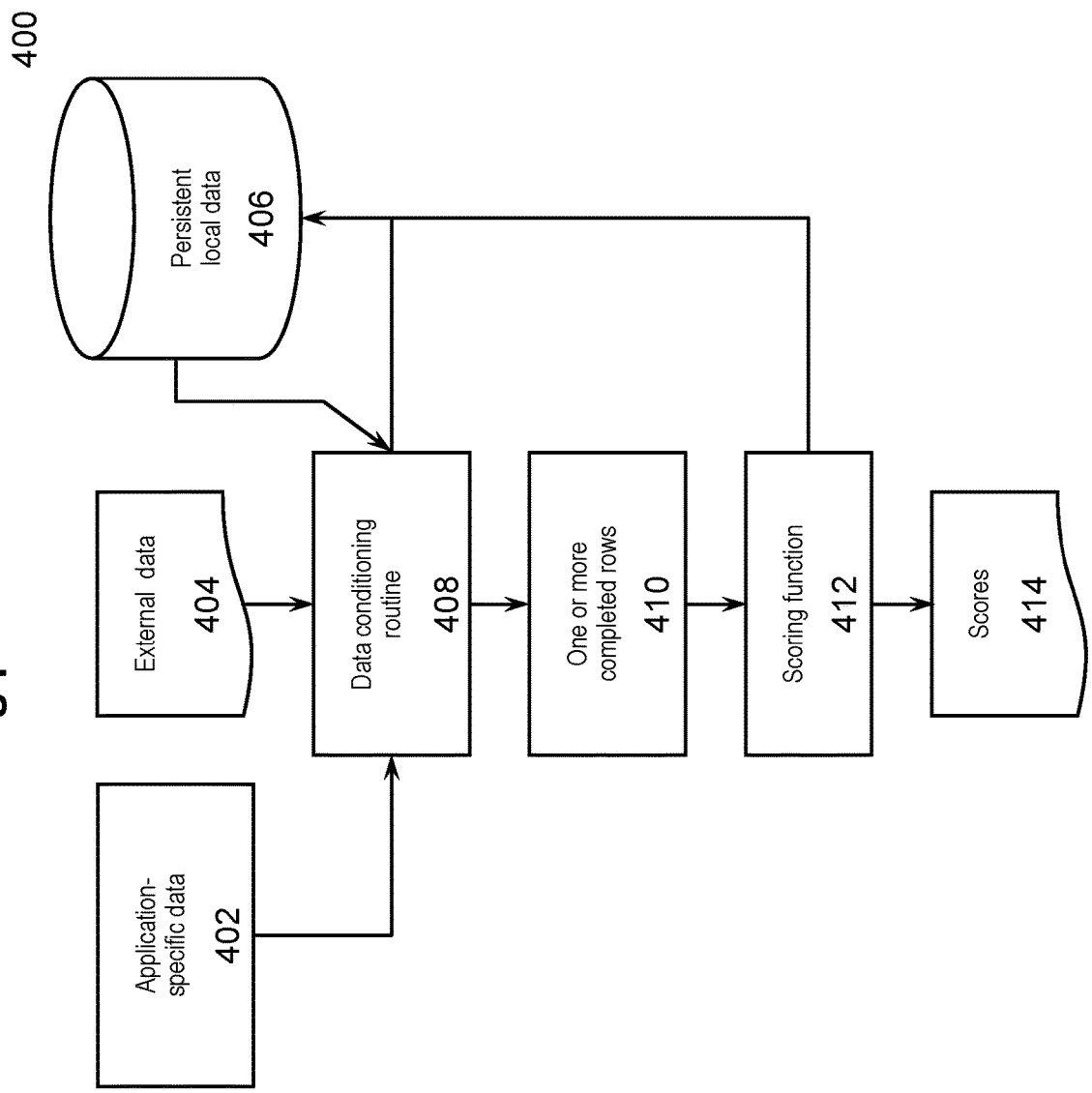
FIG. 4 shows an example embodiment of a scoring process outline in accordance with the present invention.

FIG. 4 shows an example embodiment of a scoring process flowchart 400 in accordance with the present invention. In the example embodiment, a request for application specific data 402 can be sent to a data conditioning routine 408. Application specific data request 402 can also include additional required data sent from outside the system with request 402. This additional data can include single records (e.g. as is provided when scoring a single loan application; see FIG. 5) or multiple records (e.g. as is provided when computing marketing or operations scores; see FIG. 6).

External data 404 can include data collected in response to the application-specific data request 402. This data can include results from credit bureaus, alternative credit bureaus, government records, similar sources or other sources located outside the system.

Persistent local data 406 can include data that is kept in a local database repository for more than one scoring operation. Persistent local data 406 can include information collected during previous computations of scores, such as a last date of a loan application, or external data that is present for all applications, such as geographical mapping information such as latitude and longitude coordinates.

Data conditioning routine 408 can condition data from 402, 404 and 406 into a form usable by the system. In the example embodiment this can include compiling the data into a form of one or more completed rows 410. In many embodiments, all rows 410 presented to the scoring function 412 must contain the same columns in the same order during for each call—that is, the scoring function 412 can return scoring values 414 for a rectangular table with a constant columnar structure. Scoring function 412 output can also be saved in persistent local data 406 for later usage.

Figure 5:
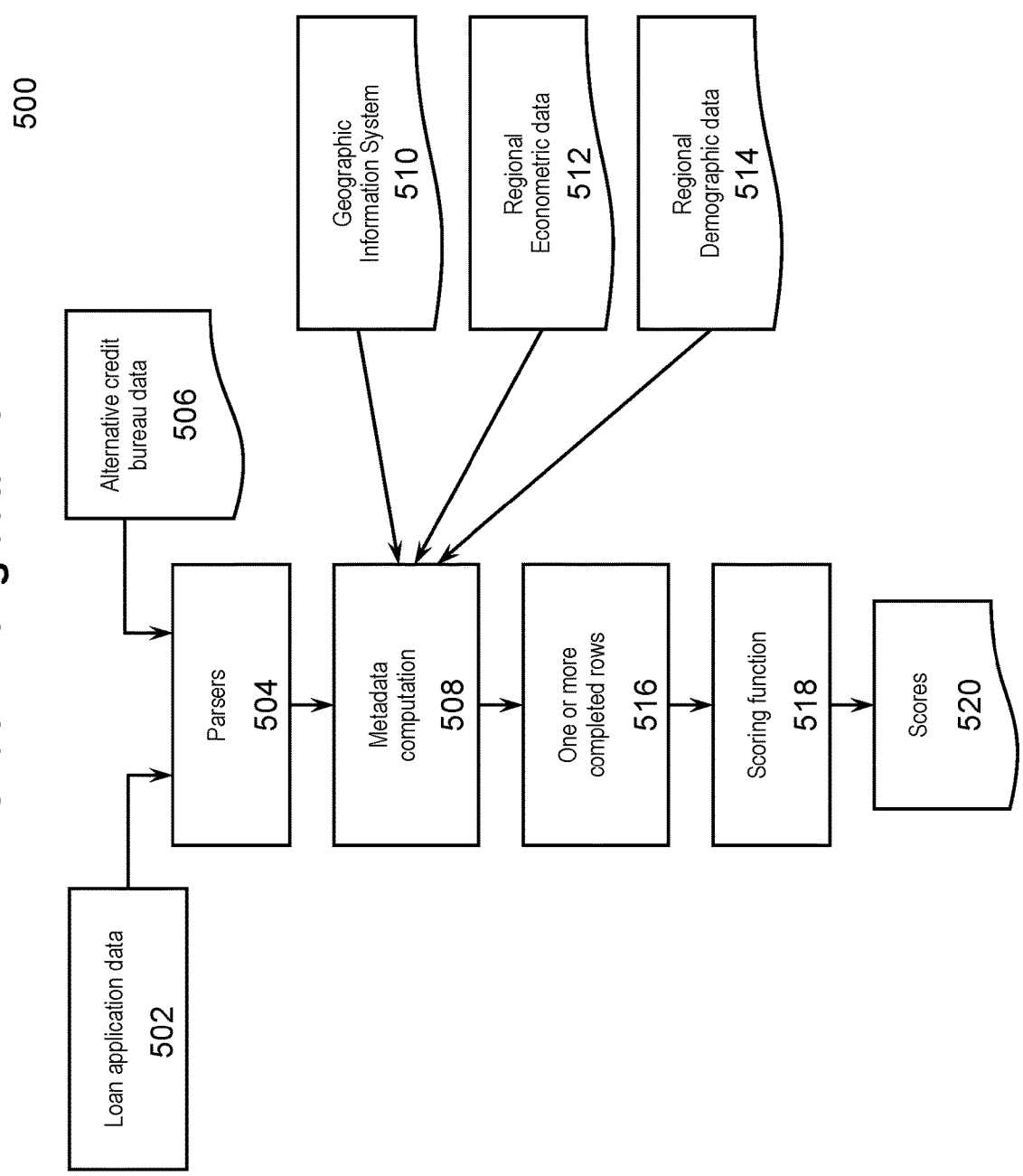
FIG. 5 shows an example embodiment of an underwriting data flow in accordance with the present invention.

FIG. 5 shows an example embodiment of an underwriting data flow 500 in accordance with the present invention. In the example embodiment, underwriting data flow 500 shows how a data conditioning layer can gather information to compute scores 520 which support a single item application process. In the example embodiment, loan application data 502 can be sent to one or more parsers 504. Loan application data 502 can include a request and additional required data sent from outside or entered into the system.

Additional credit bureau data 506 can include data collected by parsers 504 in in order to complete a request received from 502. Data 506 can include results gathered from credit bureaus, alternative credit bureaus, government records, similar sources or other sources located outside the system.

Parsers 504 can then send the compiled data from 502 and 504 to a metadata computation module 508. In an example embodiment, metadata computation module 508 can further gather and receive data from proprietary or third party sources. As shown in the example embodiment, these can include geographic information system 510, regional econometric data 512, regional demographic data 514 or other sources and can include data that is kept in a local database repository for more than one scoring operation and which can be updated according to system requirements or rules or from other, external sources. Geographical information system 510 can provide information about physical locations on the Earth, such as the location of the Empire State Building. This data can then be used to determine an unemployment rate, average salary of persons near that location or other representative information. Regional econometric data 512 can include age profiles or other similar data from regional demographic data 514. In addition, these example forms of data can be merged with further forms of useful data (not shown). For example, data from a cable provider can be merged in order to determine if a particular address has cable access, and, if so, what level of service is provided at the address.

Metadata computation module 508 can include one or more sub-modules operable to calculate one or more meta-variables as required for a particular embodiment. Metadata computation module 508 can then store data in one or more computed rows 516 for processing by scoring function 518 in order to generate scores 520. In many embodiments, all rows 516 presented to the scoring function 518 must contain the same columns in the same order during for each call—that is, the scoring function 518 can return scores 520 for a rectangular table with a constant columnar structure.

Figure 6:
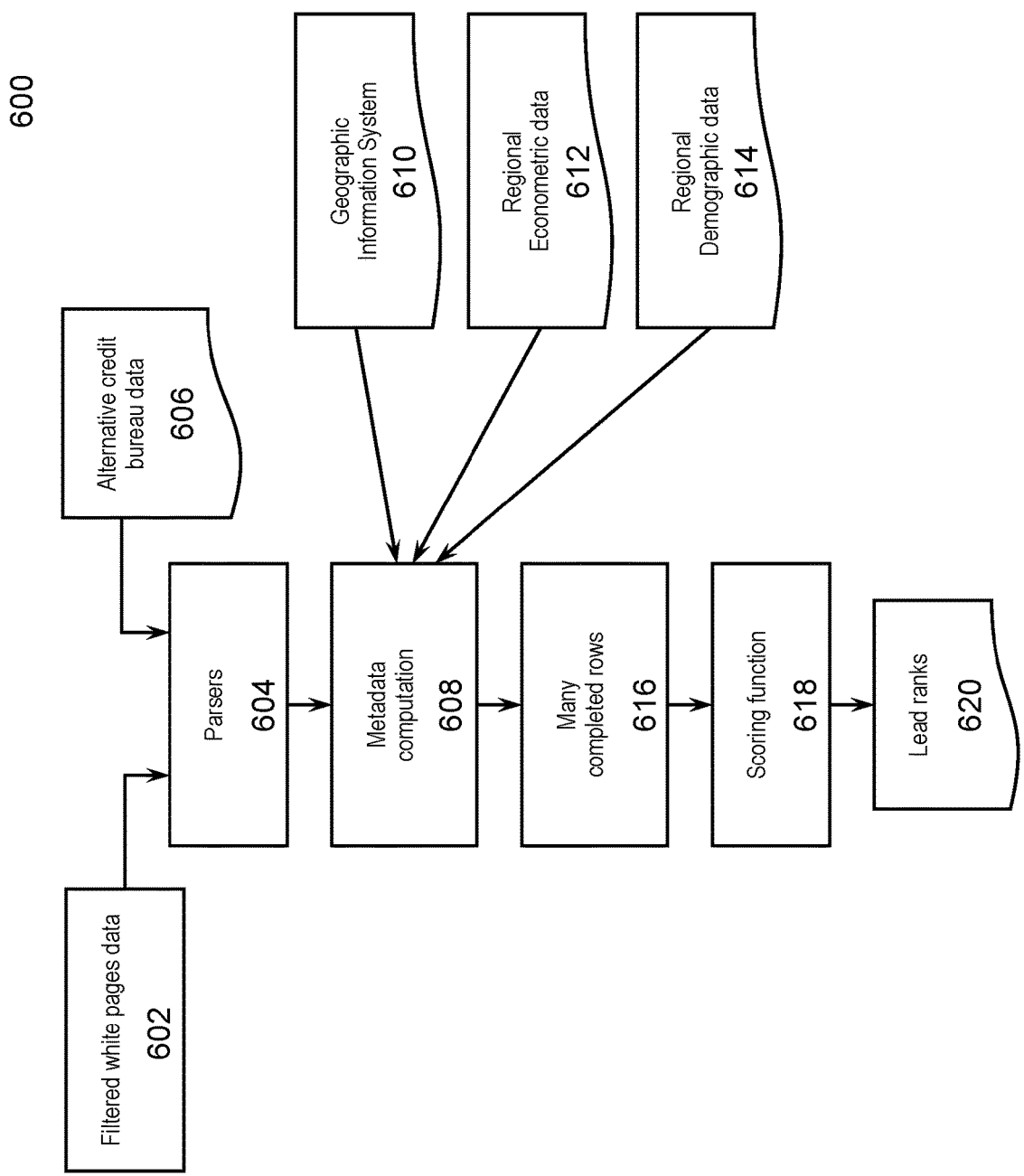
FIG. 6 shows an example embodiment of a direct mail data flow in accordance with the present invention.

FIG. 6 shows an example embodiment of a direct mail data flow 600 in accordance with the present invention. In the example embodiment, direct mail data flow 600 shows how a data conditioning layer can gather information to compute lead rankings 620 which support a multi-record application process. In the example embodiment, filtered white pages data 602 can be sent to one or more parsers 604. Filtered white pages data 602 can include a request and additional required data which is pre-filtered and sent from outside or entered into the system.

Additional credit bureau data 506 can include data collected by parsers 604 in in order to complete a request received from 602. Data 604 can include results gathered from credit bureaus, alternative credit bureaus, government records, similar sources or other sources located outside the system.

Parsers 604 can then send the compiled data from 602 and 604 to a metadata computation module 608. Metadata computation module 608 can further gather data from geographic information system 610, regional econometric data 612, regional demographic data 614 or other sources and can include data that is kept in a local database repository for more than one scoring operation and which can be updated according to system requirements or rules or from other, external sources. Geographical information system 610 can provide information about physical locations on the Earth, such as the location of the Empire State Building. This data can then be used to determine an unemployment rate, average salary of persons near that location or other representative information. Regional econometric data 612 can include age profiles or other similar data from regional demographic data 614. In addition, these example forms of data can be merged with further forms of useful data (not shown). For example, data from a cable provider can be merged in order to determine if a particular address has cable access, and, if so, what level of service is provided at the address.

Metadata computation module 608 can include one or more sub-modules operable to calculate one or more meta-variables as required for a particular embodiment. Metadata computation module 608 can then store data in many completed rows 616 for processing by scoring function 618 in order to generate lead ranks 620. In many embodiments, all rows 616 presented to the scoring function 618 must contain the same columns in the same order during for each call—that is, the scoring function 618 can return scores 620 for a rectangular table with a constant columnar structure. Lead ranks 620 can undergo further processing for categorization or other organization.

Architecture

Mobile applications, mobile devices such as smart phones/tablets, application programming interfaces (APIs), databases, social media platforms including social media profiles or other sharing capabilities, load balancers, web applications, page views, networking devices such as routers, terminals, gateways, network bridges, switches, hubs, repeaters, protocol converters, bridge routers, proxy servers, firewalls, network address translators, multiplexers, network interface controllers, wireless interface controllers, modems, ISDN terminal adapters, line drivers, wireless access points, cables, servers and other equipment and devices as appropriate to implement the method and system are contemplated.

Figure 1A:
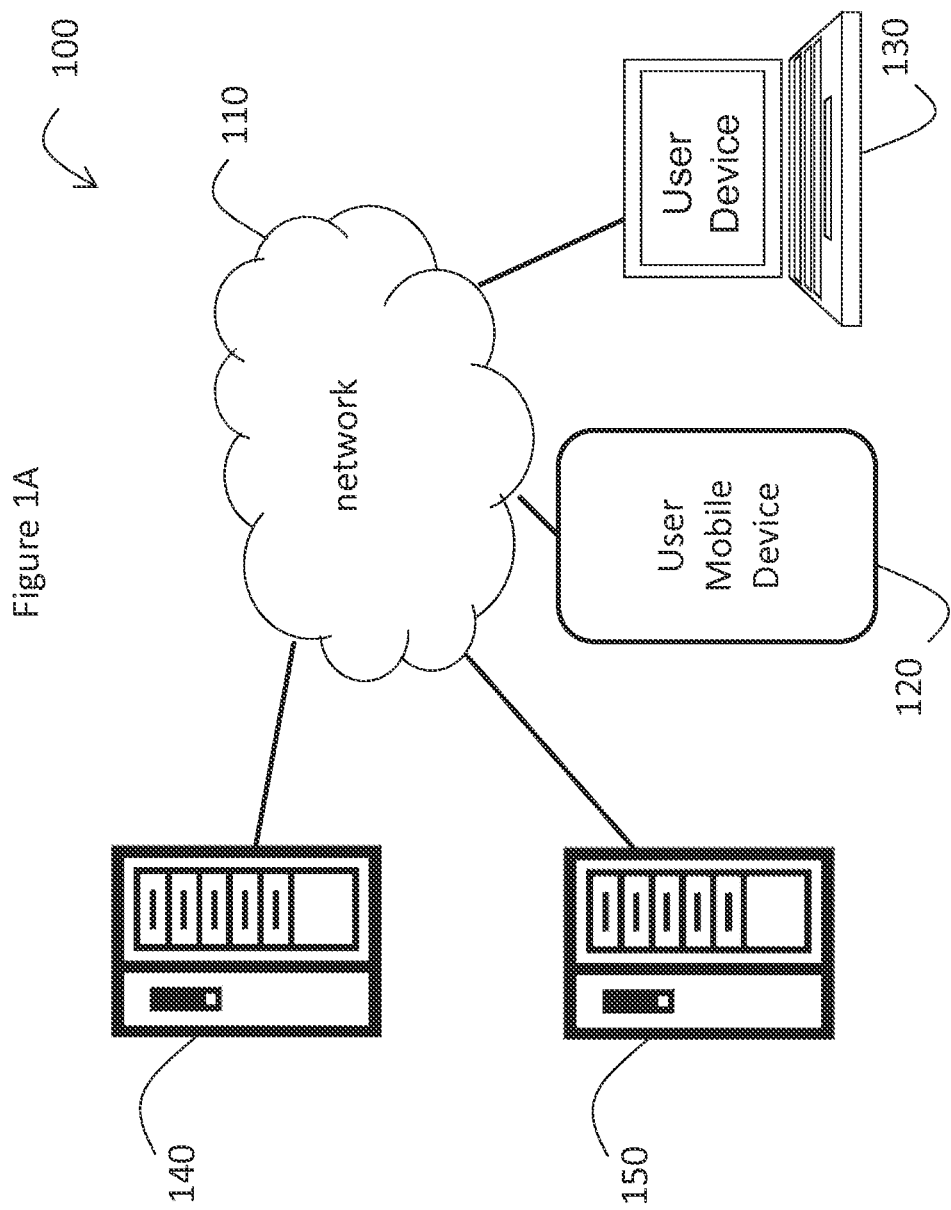
FIG. 1A is an example view of a basic network setup according to an embodiment of the present invention.

FIG. 1A shows a diagram of a server system 100 with multiple servers 140, 150 which can include applications distributed on one or more physical servers, each having one or more processors, memory banks, operating systems, input/output interfaces, and network interfaces, all known in the art and operably coupled and powered, and a plurality of end user devices 120, 130 coupled to a network 110 such as a public network (e.g. the Internet and/or a cellular-based wireless network, or other network) or a private network. User devices include for example mobile devices 120 (e.g. phones, tablets, or others) desktop or laptop devices 130, wearable devices (e.g. watches, bracelets, glasses, etc.), other devices with computing capability, non-transitory computer storage media, processors, power, network interfaces and so on appropriately and operably coupled and powered. The server system 100 includes for example servers operable to interface with websites, webpages, web applications, social media platforms, and others.

Figure 1B:
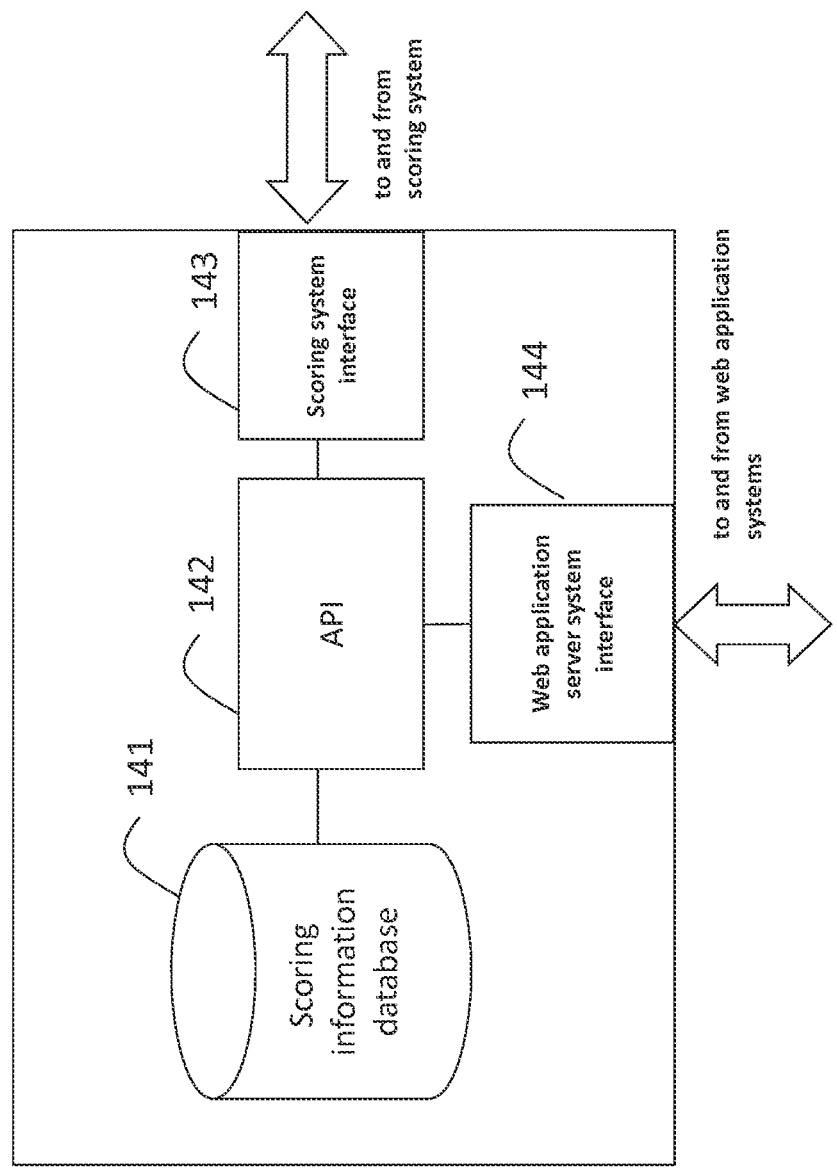
FIG. 1B is an example view of a network connected server system according to an embodiment of the present invention.

FIG. 1B shows a diagram of a server 140 according to an embodiment of the invention including at least one user device interface implemented with technology known in the art for communication with a scoring system. The server 140 also includes at least one web application server system interface for communication with web applications, websites, webpages, websites, social media platforms, and others. The server 140 may further include an application program interface (API) 142 that is coupled to a database 141 and may communicate with interfaces 143, 144 such as the scoring system interface 143 for a user device interface and web application server system interface 143, or others. The API 142 may instruct the database 141 to store (and retrieve from the database 141) information such as scoring information, user account information, user information, applicant information, geographical information or others as appropriate. The database 141 may be implemented with technology known in the art such as relational databases and/or object oriented databases or others.

FIG. 1C shows a diagram of a user mobile device 120 according to an embodiment of the invention that includes a network connected scoring application 121 that is installed in, pushed to, or downloaded to the user mobile device. In many embodiments user mobile devices 120 are touch screen devices. In other embodiments, desktops, tablets or other user devices can be used.

Setup, User and Viewer Interaction

In the current system, the outward-facing or front end portion of the code can be written in one or more general purpose languages often used for building web sites and web services and stored in non-transitory, computer-readable memory. In some example embodiments this language can include "Ruby". The inner-facing or back end portion of the system, including the scoring function can be written in one or more open source domain-specific languages designed particularly to handle statistical computations. In some example embodiments this language can include "R". In the example embodiment, the "Ruby" front end and the "R" back end portions of the code run in separate processes on the same computer. They can also communicate with one another across a local socket using a special purpose binary protocol. The front end process can also implement a web service with a "RESTful" API (where REST is Representational state transfer).

General Approach to Scoring Functions

In general, scoring functions of a scoring system (e.g. for interface with scoring system interface 143 of FIG. 1B) can work on data other than input data. This can be accomplished either by merging data from another source (such as merging census or unemployment data, as stored in a database, for a metropolitan statistical area into a marketing model to target customers) or from variables constructed from the input data (such as computing a distance from a home to an office in an underwriting model). In an example embodiment of the invention, data other than input data are referred to as outside variables and metavariables, respectively.

In many embodiments, since a scoring function is a function, operating as a set of instructions stored in a non-transitory, computer-readable medium and executable by a processor, then the data upon which the scoring function is to be evaluated can be an array of one or more rows containing all of the base columns within the scoring function's domain. In this case, the scoring function returns one value for each row in the matrix. A value may not be a single real number or integer, but can be a compound object, as in a marketing model embodiment, to provide multiple priority scores for each potential target.

This structure is implemented in a mail API (e.g. as implemented in an API 142 of FIG. 1B) by requiring an outward-facing code to call to an inner-facing code using an entry point, for example, called "build.compound.row" (BCR). BCR can take a stored collection of data, merge it with outside data and compute any metavariables that are associated with a desired or chosen call. BCD can then remove any columns that should not be returned before returning the resulting array. The scoring function can be called on the resulting array and return one score per row of the array.

Metavariables can be derived quantities which can be used to compute scores in example embodiments. In a loan application example, three metavariables examples can include: (1) a latitude and longitude of a point from which an application for a loan is made, (2) a latitude and longitude of a loan applicant's claimed address, and (3) a distance between a point at an application is submitted and a loan applicant's claimed home address. Although each of these three are examples of metavariables, the third example is not computable directly from a loan applicant's loan application data. Rather, it must be computed indirectly using the first two metavariable examples. Thus, metavariables can be independent of one another, as the first two examples show, meaning that it does not depend on other metavariables. Alternately and additionally, metavariables can be dependent on other metavariables, as the third example shows, where the third example metavariable is dependent on the first two example metavariables.

The process of parsing the data, using a processor, into a form to which outside data can be joined and from which metavariables can be computed is configured as a part of the client layer. In some embodiments, this configuration can be implemented using a text file containing a Universal Parsing Definition (UPD) object represented in JSON, a standard textual format for storing or exchanging structured data. A Universal Metadata Definition (UMD) object, also represented as a JSON object, can describe how the metavariables are computed from the resulting parsed objects. A black-list, also represented by a JSON object, can then describe which variables are obscured before running the scoring function.

FIG. 7 shows an example embodiment of a functional API flow structure 700 in accordance with the present invention. In the example embodiment, a first step 701 can include an external client 710 calling into a data conditioning and row creation process through a standard, well known, API 720 (e.g. API 142 of FIG. 1).

Data can be passed through the API layer of the Standard API 720 and can be collected with other external data requested from or sent by the external client 710 to the Standard API 720 and any persistent data stored in a local or otherwise coupled system database or databases and parsed in step 702 using a set of parsing functions according to a set of protocols described by a Universal Parsing Definition (UPD) file 702. A further example embodiment of step 702 is described below with respect to and shown in FIGS. 8A-8B.

The parsed data 730 can then be transformed into enriched data 740 with a set of high value signals according to a set of recipes, functions, or other instruction sets defined in a Universal Metadata Definition (UMD) file in step 703. These signals can exist in the form of variables or metavariables in some embodiments. A further example embodiment of step 703 is described below with respect to and shown in FIGS. 9A-9B.

The enriched data 740 can then be filtered through one or more black lists, if applicable, yielding a filtered signal set of data 750 consisting of a named list of vectors. If no black lists are applicable then step 704 can be skipped in some embodiments. In many embodiments it can be essential that the list of vectors includes vectors with compatible lengths—either a length of 1 or a constant of a length greater than one.

The list of vectors in the filtered signal set 750 can then be assembled into a table, for example a rectangular table, in step 705. A further example embodiment of steps 704 and 705 is described below with respect to and shown in FIGS. 10A-10B. In many embodiments, this can be a data frame. As such, this can lead to a row creation 760.

The row creation 760 can then be returned to the external client 710 for further processing in step 706. The external client 701 can then view, edit, manipulate or otherwise use the data as required. In the example embodiment, this can include sending the data through one or more scoring functions 770 (locally or remotely) and then receiving results in step 708.

UPD Objects

Figure 8A:
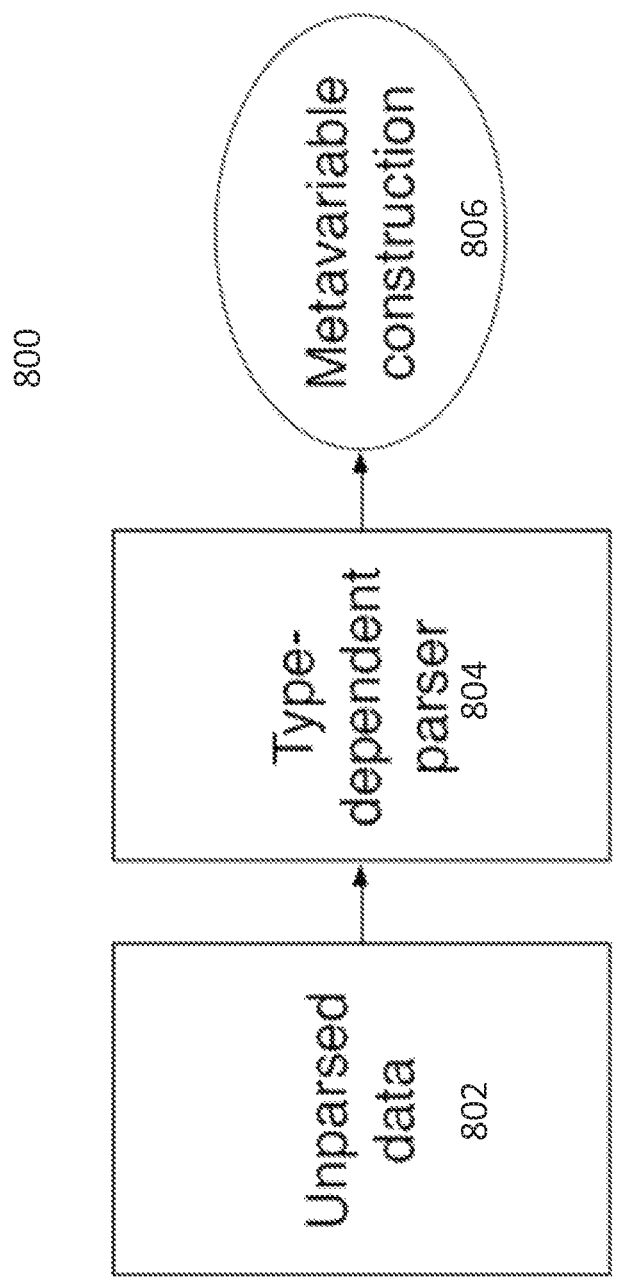
FIG. 8A shows an example of functional data flow through parsers in accordance with the present invention.
Figure 8B:
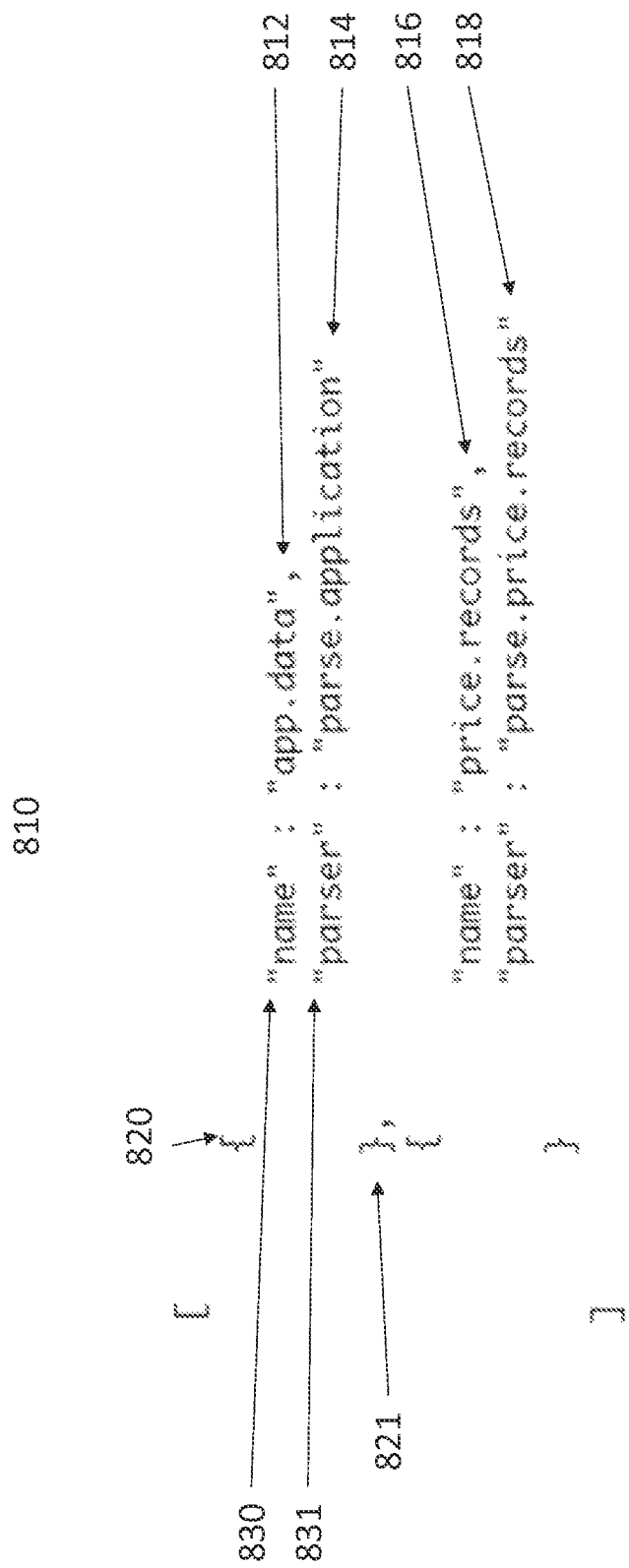
FIG. 8B shows an example of a segment of a UPD file in accordance with the present invention.

FIGS. 8A-8B show parsing for input data. This can be an example embodiment of step 702 described previously and shown in FIG. 7.

FIG. 8A shows an example embodiment of functional data flow 800 through a parser in accordance with the present invention. Unparsed data 802 can enter a parser segment, which can be a type-dependent parser 804, as a list of named items. These items can then be parsed according to a set of records specified in a UPD file. These can then be passed to 806.

FIG. 8B shows an example of a segment 810 of a UPD file in accordance with the present invention. The UPD file segment 810 is shown in JSON. Shown are parsers for each of two different data sources: 'app.data' 812, which can be parsed using a function called 'parse.application' 814, and 'price.records' 816, which can be parsed using a function named 'parse.price.records' 818.

A universal parser definition (UPD) object as shown in the example embodiment starting at 820 and ending at 821 can be a list of parsing transformations that takes raw data fields (e.g. 812) and parses each into another list of lists of elements (e.g. 814) that can then be used as input to a set of metavariables. Each UPD object can include a list of two string fields: a name field 830 and a parser field 831. When a named element (e.g. 812) is passed into a function, such as a build.compound.row function, a value of the named element can be parsed using a function named by the parser field 831. A value of the parser function can be a named list with a length greater than or equal to a list containing the results of parsing the named object using the parser field 831.

In an example embodiment, if a named element 830 is an XML record or a JSON object 812 then a returned list might include individual values parsed out of the XML record or JSON object 812. In embodiments where the list is a list of JSON objects 812, then a returned list can be expected to contain a list of items parsed out of each individual JSON object 812 where, in turn, each sublist is the same length.

In an example embodiment of the client API, UPD objects can be defined in JSON (Javascript Object Notation). Alternatively, UPD objects can be defined in an XML file with a known schema, as a comma-separated value (CSV) file, or in an opaque format such as might arise from serializing an object and storing it.

UMD Objects

Figure 9A:
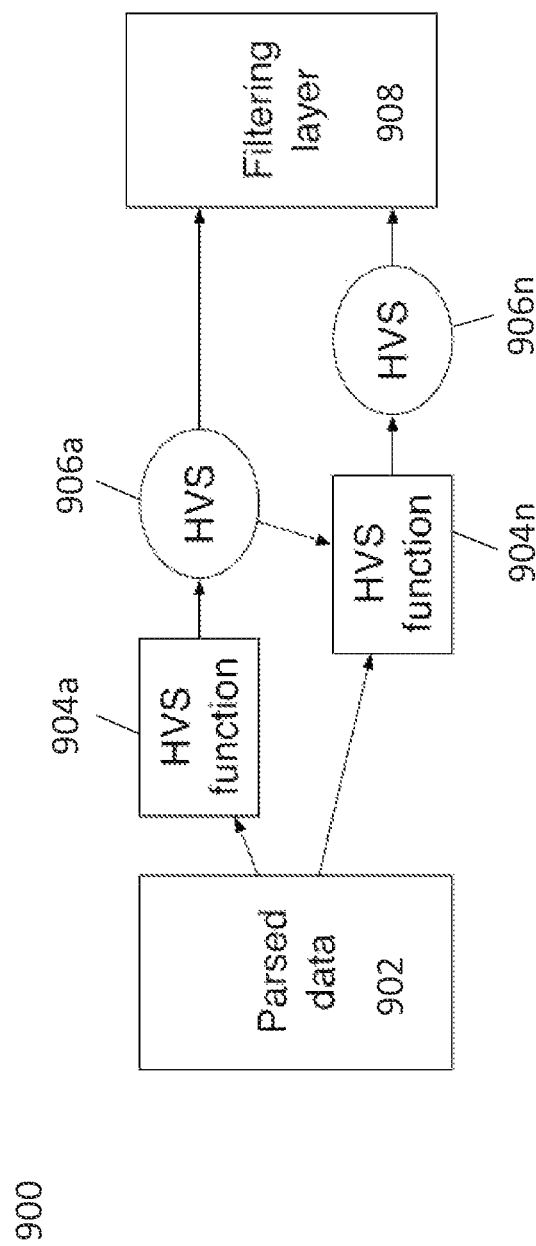
FIG. 9A shows an example of a functional data flow through a metadata computation layer in accordance with the present invention.
Figure 9B:
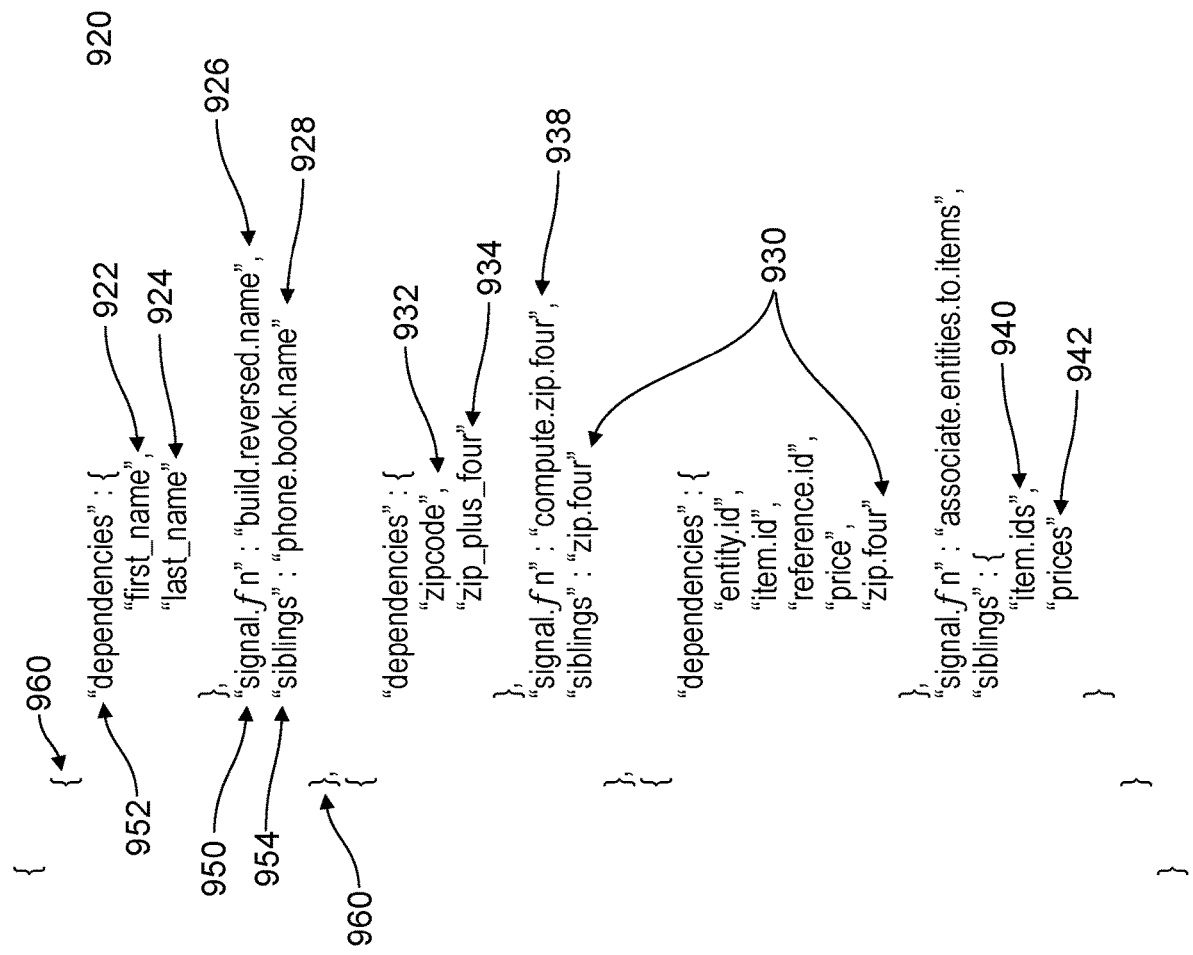
FIG. 9B shows an example of a segment of a UMD file in accordance with the present invention.

FIGS. 9A-9B show an example embodiment of how high value signals can be built or created using parsed data. This can be an example embodiment of step 703 described previously and shown in FIG. 7.

FIG. 9A shows an example of a functional data flow 900 through a metadata computation layer in accordance with the present invention. Parsed data 902 (e.g. parsed data 730 of FIG. 7) can be passed through one or more metavariables high value scoring (HVS) functions 904a, 904n. In many embodiments, the inputs to one HVS function 904n may include an HVS output 906a from a different HVS function 904a. HVS outputs 906a, 906n can be enriched data (e.g. enriched data 740 in FIG. 7) which can then be passed through a filtering layer 908 (e.g. step 704 in FIG. 7). For instance, in an embodiment, the latitudes and longitudes of two different points can be parsed data 902. These latitudes and longitudes can be processed or computed using HVS function 904a and returned as metavariables HVS 906a. The distance between the latitude and longitude of the two different points might be combined using another HVS function 904n to compute the geodetic distance between them. Then, if necessary, this information could be filtered in a filtering layer 908.

FIG. 9B shows an example of a segment 920 of a UMD file in JSON in accordance with the present invention. The example embodiment shown of UMD file segment 920 describes the computation of four HVS metavariables. A first HVS metavariable 'phone.book.name' 928 can be computed from a variable 'first.name' 922 and a variable 'last.name' 924 through the function 'build.reversed.name' 926. A second HVS metavariable 'zip.four' 930 can be computed from a variable 'zipcode' 932 and a variable 'zip_plus_four' 934 using the function 'compute.zip.four' 938. A third HVS metavariable 'item.ids' 940 and a fourth HVS metavariable 'prices' 942 can be computed from five variables, including the second HVS metavariable 'zip.four' 930, which was previously computed as described above.

A universal metadata definition (UMD) object can be a list of transformations that compute HVS metadata from other data variables and, in some embodiments, from other HVS metadata. Each of these UMD objects can contain three parts: 1) a string naming a transform 950 that creates one or more HVS metavariable names and two lists of strings; 2) "dependencies" 952 of the transform; and 3) "siblings" 954 computed by the transform. So, in the example embodiment shown in FIG. 9B, a first UMD object starting at 960 and ending at 961 includes each of the following. First, a string naming a transform 950 that creates one HVS metavariable names "build.reversed.name" 926. First string list 2 "dependencies" 952 of the transform including "first_name" 922 and "last_name" 924. Second string list "siblings" 954 including "phone.book.name" 928 computed by the transform.

As described above, a transform (e.g. 950) can be a function that uses two or more variables and returns at least one computed metavariable. The list of dependencies (e.g. 952) and the list of siblings (e.g. 954) can be related only by the fact that the list of dependencies are used to construct the list of siblings through the specified transformation; the two lists need not be the same length nor need the elements of the two lists match up in any way in some embodiments. A transform member can be the name of a function that performs the transform. The function to which a given transform name is associated can be looked up by name when a UMD file is loaded. This operation can be accomplished in languages which support reflection, such as Java, R, S-plus or Python. Additionally, this operation can be accomplished in languages which support dynamic loading by name, such a C or C++ or in any language with access to a DLL's symbol table in Windows environments.

As described above, values of one metavariable can depend on the values of other metavariables. For instance, the distance between two addresses can typically be computed from the geodetic distance between their latitudes and longitudes, but the addresses themselves would not usually be presented in that form. As an example, a human may know that the Taj Mahal is a building in India but would likely be unaware that the Taj Mahal is located at 27.175015 North, 78.042155 East. Typically, the latitude and longitude (as initial metavariables) corresponding to a given address can be first computed using a geographical information system before geodetic distances between points can be computed from those initial metavariables.

In an example embodiment of the client API, UMD objects can be defined in JSON (Javascript Object Notation). Alternatively, a UMD object can be defined in an XML file with a known schema, or in an opaque format such as might arise from serializing an object and storing it.

Blacklisted Variables

Figures 10A, 10B:
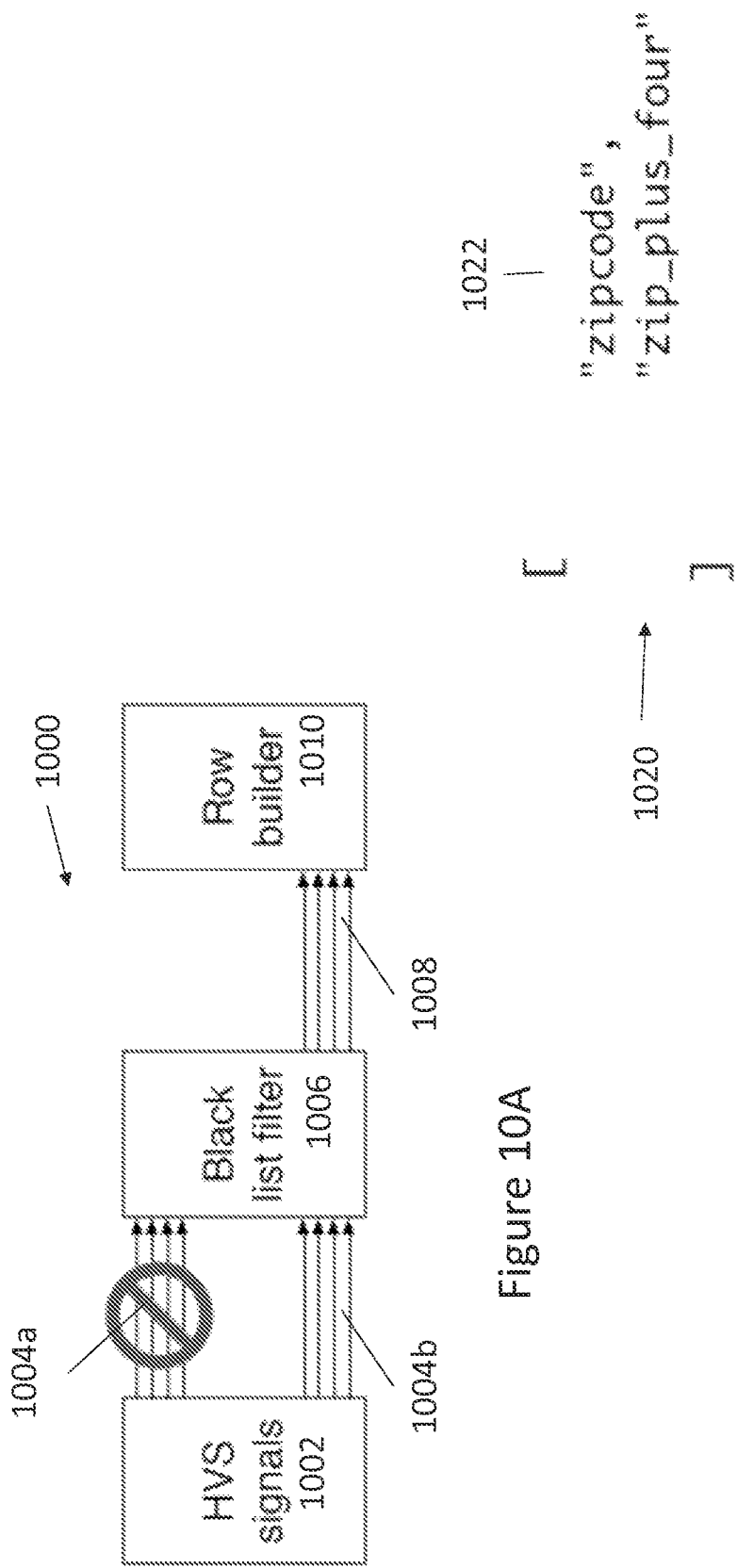
FIG. 10A shows an example of a functional data flow through a filtering layer in accordance with the present invention.
FIG. 10B shows an example embodiment of a blacklist file in accordance with the present invention.

FIGS. 10A-10B show an example of removing unwanted signals using a black list.

FIG. 10A shows an example of a functional data flow 1000 through a filtering layer in accordance with the present invention. The filtering layer can receive enriched data (e.g. see 740 of FIG. 7) emitted by a metavariables computation layer and filter out any signals 1004 from a collective set of signals 1004a and 1004b which are not to be included in a final output frame. These filtered signals 1004a might either been barred by regulatory or legal reasons, or because they are not compatible with an output frame.

To elaborate, in the example embodiment, some or all generated HVS signals 1002 (e.g. in the form of enriched data 740 of FIG. 7) can be a group of collective HVS signals 1004a and 1004b sent to a black list filter 1006 for processing. Black list filter 1006 can then block blacklisted HVS signals 1004a of the group of collective HVS signals 1004a and 1004b based on particular rules or regulations (e.g. as step 704 in FIG. 7). A group of acceptable, allowable or otherwise usable HVS signals 1008 (e.g. in the form of a filtered signal set 750 of FIG. 7) can then be sent (e.g. as step 705 of FIG. 7) to a row builder 1010 (e.g. for row creation 760 of FIG. 7).

FIG. 10B shows an example embodiment of a segment 1020 of a blacklist file in accordance with the present invention. This blacklist segment 1020 is shown as a JSON file segment containing a list 1022 of regular expression that represent the names of all fields which must be removed prior to row construction (e.g. "zipcode" and "zip_plus_four" are listed here, corresponding to 932 and 934.

Some elements may not eligible for use in implementing the system and methods described herein. For instance, in some embodiments, scoring functions may be required to depend only upon variables available at a particular scoring time or set of scoring times. In many embodiments there are variables that are available during a training time in which functions are being trained which are computable during the training but which are not available during the scoring time. In one example embodiment, loan performance of a previously given loan can be used to train a function. For reproducibility, any values associated with such variables from a previously given loan may need to be erased at the scoring time of a new loan processing. In addition, there can be variables which are available in implementation of a function but which may not be used for reasons such as privacy protection, legal reasons such as non-discrimination, or data source usage restriction. To guarantee that these variables are not available during production calls in the form of actual loan processing, each client layer can contain one or more blacklists of variables which can be removed, blocked or otherwise not used at production time.

Data Flow in this Notional System

In an example embodiment, an external customer or other third party can call an outer layer of an API through a specified external endpoint, either through a web service as in a real time client accessing the system over a network or by instantiating one or more files in a jointly-accessible repository or other networked database. In the first step of a subsequent process, the reference implementation can consume or otherwise process that data and produce a set of one or more rows of assembled data to be scored by an associated scoring function. In a second step, this a set of one or more rows of assembled data is passed on to a scoring function, which can return one or more scores for each row to the external customer or other third party, either directly as at least one file through a web service or by saving one or more result files in a jointly-accessible repository or other networked database.

OTHER ASPECTS OF THE INVENTION

Horizontal Scaling

Figure 11:
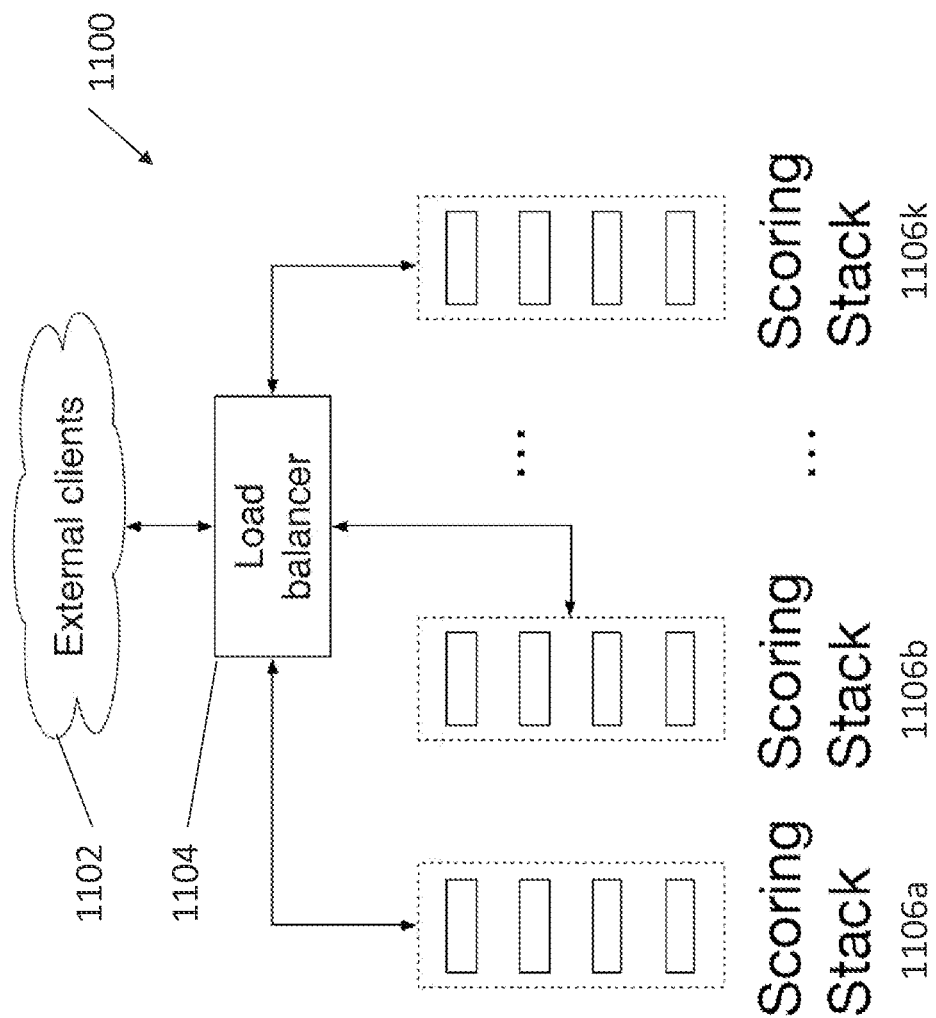
FIG. 11 shows an example embodiment of a functional diagram of horizontal scaling in scoring in accordance with the present invention.

FIG. 11 shows an example embodiment of a functional diagram of horizontal scaling 1100 in scoring in accordance with the present invention. The diagram shown in FIG. 11 demonstrates how some embodiments can implement flow processes (e.g. FIG. 7) in parallel in order to achieve scaling in calculating and implementing large numbers of metavariables. To the extent that different scoring functions are completely independent of one another—that is, have no shared state—then many different scores can be simultaneously computed by simply replicating scoring stacks horizontally. In many cases where there is a shared state, horizontal scaling can be accomplished by storing shared data in a shared database.

Many domain specific computer programming languages can be slow. R, for instance, can be as much as two orders of magnitude slower than a general purpose language such as C or C++ when performing tasks such as string manipulations or list constructions. Two broad ways to work around or otherwise avoid these time delays include re-implementing portions of an API, scoring functions or both in a general purpose language or by scaling out the API, scoring function calls or both horizontally and then running or otherwise processing API, scoring function calls or both with few interactions between multiple machines or modules simultaneously. In some embodiments, as a rule, a re-implementing process can be implemented for the API kernel code. Since the API kernel code is frequently called and is typically managed by a single team of developers in an organization, it can be worth optimizing. Because scoring functions themselves or outer layers of API clients can be typically maintained by modelers or other data scientists, there may be little or no benefit to optimizing the code of the scoring functions themselves or outer layers of API clients. This can also result in unnecessarily high costs for their optimization. Functions in an outer layer of the API implementation are typically small and often vectorized. DSLs for mathematical or statistical operations are typically highly optimized for individual implementations within a system. As such, rewriting parser functions or metadata generator functions may provide a minimal speed-up during production. Since client layers should have a common structure across many clients in order to optimize sharing production and test code and since scoring functions typically need to readable by relatively unsophisticated coder such as modelers or other data scientists, rewriting either of them can be wasted effort.

In some embodiments, horizontally scaling a system by replicating an API across many machines in parallel is a desirable approach to meeting throughput and latency requirements if they are not met when running the system on a single processor. In various embodiments, this form of horizontal scaling can be performed in many different ways. In some embodiments this can include sharing outer API layers and distributing the calls to the API from the outer API layers to scoring layers. In some embodiments this can include replicating entire stacks across many machines and load balancing at the machine level. In either case, the result of load balancing can be a significant increase in the throughput of data in the API and can result in reduction in data latency.

Blue Lists

Figure 12:
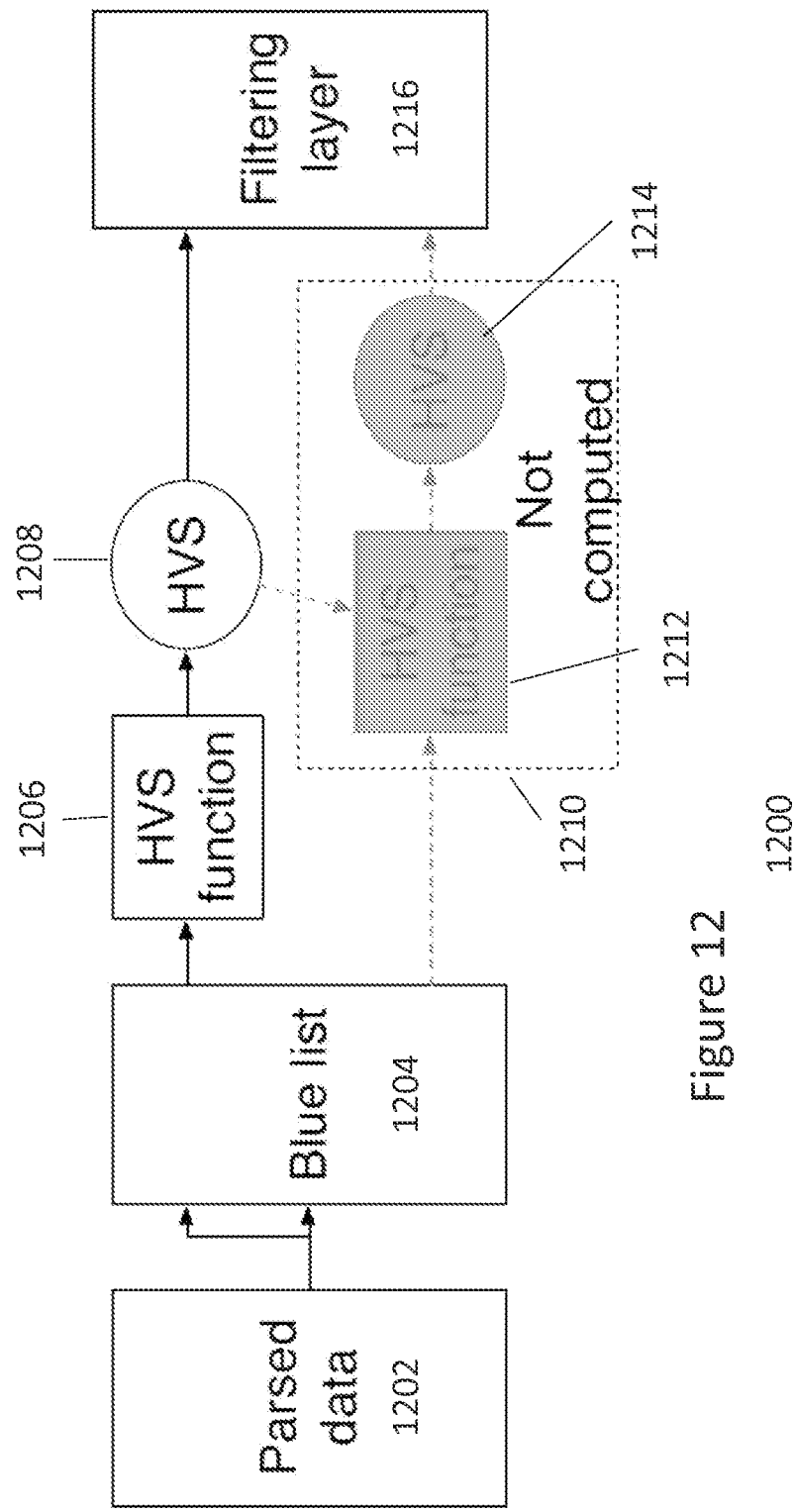
FIG. 12 shows an example embodiment of a functional diagram of blue list filtering in accordance with the present invention.

FIG. 12 shows an example embodiment of a functional diagram of blue list filtering 1200 in accordance with the present invention. Blocking scoring on the basis of certain variables can have both legal and performance advantages in some embodiments. Legal advantages can be recognized when an operator needs to demonstrate that a given variable does not enter, directly or indirectly, into a computation. Performance advantages can be recognized if the system is able to blocks computations of expensive time or processing intensive variables.

Latency can increase when extra, lengthy or unnecessary computations of metavariables occurs in various implementations or embodiments. Metavariables can be computed automatically for scoring functions which may eventually use them in addition to preserving scoring function code for the metavariables across multiple scoring functions. However, some scoring functions may require only a small subset of metavariables and by restricting computations performed on various variables to those necessary for a particular scoring function, the latency of each call for a variable can be reduced.

Various embodiments can support "blue lists." "Blue lists" can be lists of all variables actually used or otherwise processed by the scoring function during a calculation, regardless of whether they are externally or internally computed. Associated kernels may only require the scheduling of computations of variables that are actually used or otherwise processed by the scoring function based on one or more particular "blue lists," thus reducing the number of metavariables actually computed. An example embodiment can use a particular set of UMD, UPD, and black list files along with the stored code that defines the parser and metadata construction code.

As shown in the example embodiment in FIG. 12, parsed data 1202 can be sent through a blue list 1204. The blue list 1204 can pass through the list of variables that are included in the blue list to an HVS function 1206 for processing. As described previously, an HVS function 1206 can then send a computed HVS 1208 to a filtering layer 1216. For data not included in blue list 1204, the data be blocked or otherwise not forwarded along to a functional block 1210 which is not required in the particular embodiment. Functional block 1210 can include a HVS function 1212 which would otherwise output an HVS 1214 to be passed to filtering layer 1216. Since functional block 1210 is avoided completely by filtering using blue list 1204 because it is not used in the embodiment, no resources are unnecessarily expended in unnecessary processing. This can save a great deal of time and improve processing performance, especially in embodiments where a multitude of HVS functions would otherwise be processed.

In an example embodiment, adding one or more blue lists can reduce the latency of each scoring call from almost three seconds to approximately 100 msec.

Statelessness

There are a number of scoring function applications that may require stateful behavior, in which a final score of an array is computed by several back-and-forth exchanges between a client and one or more scoring functions. An example is multi-pass scoring. In multi-pass scoring the client can call a function such as build.compound.row, as described elsewhere herein, and initially score the result using a first scoring function. Depending on the initial score from the first scoring function, the client can call build.compound.row again and create a second score result using a second scoring function. To the extent that the two calls to build.compound.row share common parse results or common metavariables, unnecessarily repetitions in processing can be avoided in the second build.compound.row call by storing the results of the first call. In an example embodiment, an applicant borrow may apply for a loan. In embodiments where the loan application is denied, an underwriting system may need to generate an "adverse action letter" for the denied applicant borrower which details the reasons why their application was denied. In order to reduce a cost of proxy computation, it can be helpful to delay processing of the reasons for inclusion in the adverse action letter to a time after the application itself is scored. This is due to the temporal cost of proxy computations involved in generating the reasons for inclusion in the adverse action letter. Delaying determination processing requires that the system be able to return the result of that determination with the portion of the system which initially requested that determination. In some embodiments of this system, this return is performed by invoking a 'callback function' which can be passed to the determination processing. A callback function can be a function which is expected to be called when an asynchronous processing step such as the determination processing step completes its task. In some embodiments of this system, the content of the object passed to the callback function can be the actual result of the computation, such as the text of an adverse action letter. In other embodiments, the determination process can pass a reference to the desired output, such as a file name or a database key, to the callback function. In yet other embodiments, the determination system can invoke the callback function with only the data required to construct the final result, as when a determination system computes only codes for the reasons to be reported in the adverse action letter, leaving the actual construction to the callback function.

Data allowing the determination of the content of the callback function must be available to the determination process. In some embodiments, this data can constitute an encapsulation of the function itself, a mechanism by which the callback can be recovered from memory, or a pointer to a persistent resource within which the result of the determination system can be stored. In other embodiments, there may be no explicit callback function, but rather a second subsystem which is only invoked when the determination system stores its results in a known location which was provided to the determination system when it was invoked.

These data items: the nature of the content function, a key or location within which the results are to be stored, or the like, is referred to as persistent state. Systems which retain such information are referred to as stateful. They are said to exhibit statefullness.

FIGS. 2A-2C

Figure 2B:
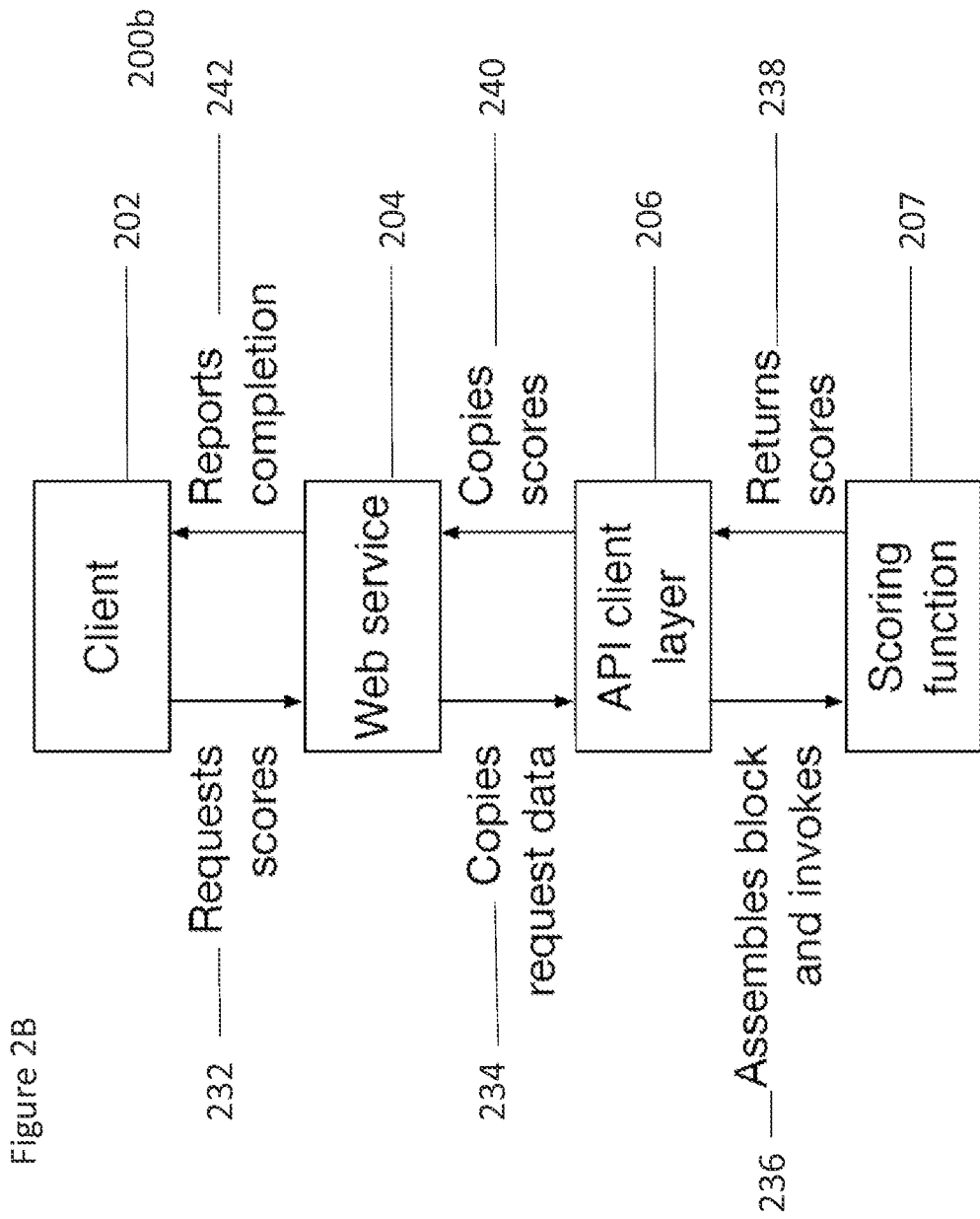

FIGS. 2A-2C are example views of flow chart diagrams of a first stage 200a, a second stage 200b and a hybrid first and second stage batch request 200c respectively, of system interaction according to an embodiment of the present invention.

As shown in FIG. 2A, in a first stage 200a of a real-time request in an example embodiment, a first step 210 can be a client 202 assembling and passing information required to construct a scoreable object, along with a request that a scoreable object be constructed, to a web service 204. The web service 204 can then pass this to an API client layer 206 which can construct the scoreable object without passing any information on to a scoring function (not shown in FIG. 2A). The construction process can request information in step 212 from other sources 208 during the process of object construction. The requested information from other sources 208 can then be received in step 214 at the API client layer. The scoreable object 216 can be created and stored along with a unique identifier in step 216 inside the API client layer 216. The unique identifier (e.g. a scoreable object ID) for the scoreable object can then be sent back to web service 204 in step 218 for forwarding to the client 202 in step 220. In order to minimize the amount of information transmitted to and from the client 202, only the object ID is passed to the client 202. This can help optimize the system by reducing processing and timing costs associated with data in the system.

As shown in FIG. 2B, in a second stage 200b of a real-time request in an example embodiment, the client 202 may request that the score for a particular object be computed in step 232. As such, client 202 thus invokes the web service 204 requesting that the score for the object with a unique scoreable object ID (e.g. the one received in step 220 of FIG. 2A). Web service 204 can pass or copy and pass this information on to the API client layer 206 in step 234, which in turn can assemble one or more blocks and invoke a scoring function 236 in step 236 by calling it. Scoring function 207 can then process the invocation and create a score before returning the score to the API client layer in step 238. The score can be transmitted from the API client layer 206 and copied by the web service 204 in step 240. Web service 204 can then report completion to client 202 in step 242, along with sending any information necessary for client 202 to associate the score with the request from step 232. This score can be reflected, described or reported to client 202 in a format understood by client 202 for whatever subsequent processing client 202 may require.

As shown in FIG. 2C, a batch request 200c in an example embodiment, can be a merger of a first stage 200a and a second stage 200b of the real-time request. A batch request can differ from a real-time because scores computed in response to a batch request are not expected to be returned immediately. In general, a batch request can include many queries, and many scores can be returned in response to such queries. In the example embodiment, a client 202 can send a scoring request to a web service 204 along with one or more pointers to stored data in step 250. The information and data necessary to compute scores in scoring functions 207 can be stored in a storage 209 that is accessible by Web service 204. The Web server can request data information from storage 209 in step 252 and receive data information in step 254. Web service 204 can forward all necessary data information on to API client layer 256 in step 256, where API client layer 256 can assemble a set of requests corresponding to the input data in step 258. These requests can then be forwarded to scoring functions 207 in step 260 where scores can be generated in step 262. Scores can then be stored in storage 209 which client 202 can access and one or more completion reports can be passed to client 202 through steps 266, 268 and 270.

FIGS. 3A-3C

Figure 3A:
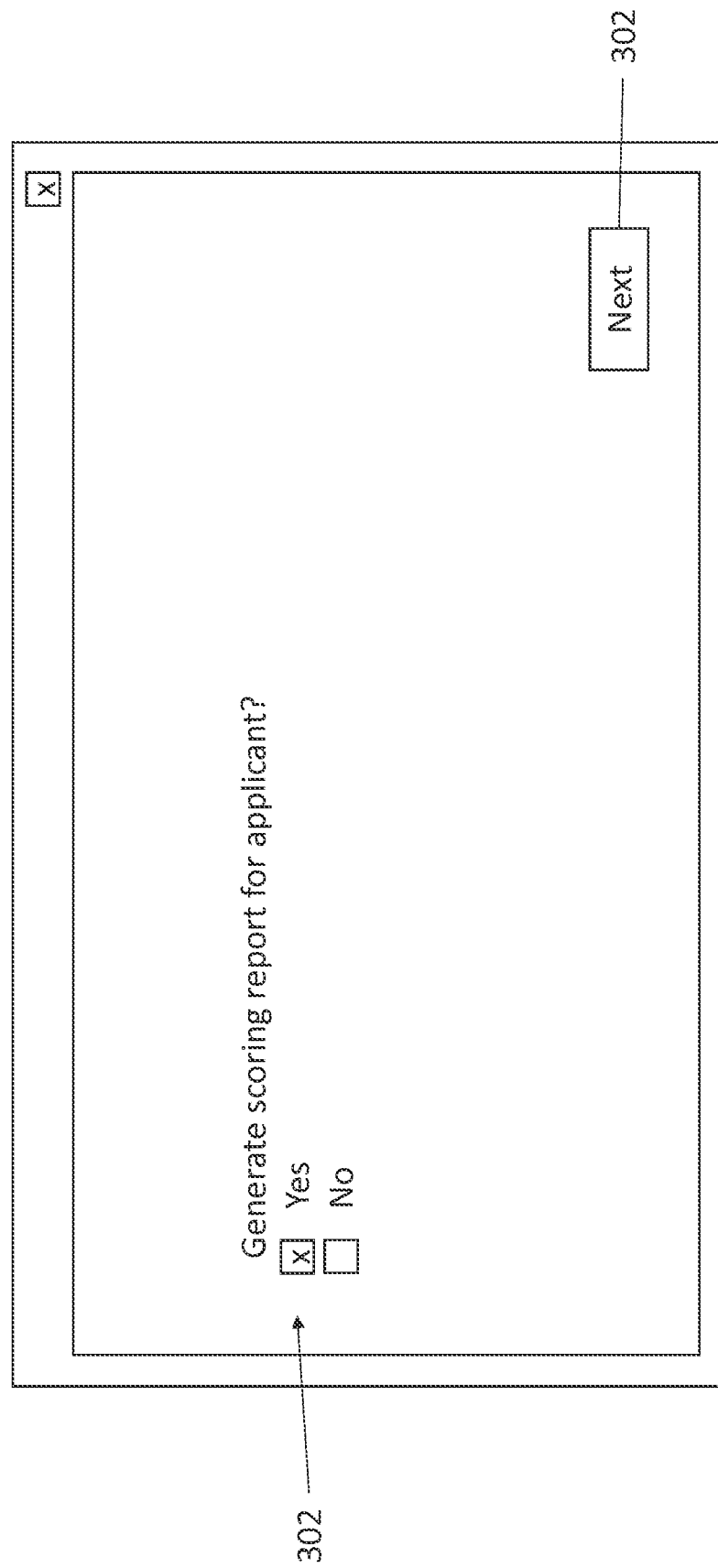

FIGS. 3A-3C show example embodiments of user interfaces 300, 310 and 320 respectively, for an end-user implementing the systems and methods described herein. In FIG. 3A a user may be presented a user interface 300 with a user selectable option 302 to generate a scoring report for an applicant, for instance in an underwriting context. If the user elects to generate a scoring report for the applicant by selecting an affirmative option such as yes and choosing a next button 302, the user may be presented with a next screen, such as in FIG. 3B.

FIG. 3B shows an example embodiment of an applicant information input screen 310. In the example embodiment a user may input information about the applicant in user input area 312 such as identifying information including a first and last name, an address including city state and zip code, and a length of time living at a residence. Dropdown menus may be used to allow the user to select years, months, days, fortnights, or other time lengths or other listed options. The user can then select a next button 314 and be presented with another screen, such as in FIG. 3C.

FIG. 3C shows an example embodiment of a variable selection screen 320 which allows a user to select either a type or a number and type of selectable variables 322 to include in generating a scoring report for a particular applicant. These can be in the form of dropdown menus as shown in the example embodiment. In other embodiments there may be checkboxes, radio buttons, text input or other ways of selecting variables to use.

Once selectable variables 322 have been chosen by a user, the user can select a generate report button 324. This will cause the program to apply a particular scoring function as described herein and to generate a report. In the example embodiment this can include outputting a report for the user determining the applicant's reliability or likelihood of paying back a loan and whether the applicant's request should be granted.

Figure 13:
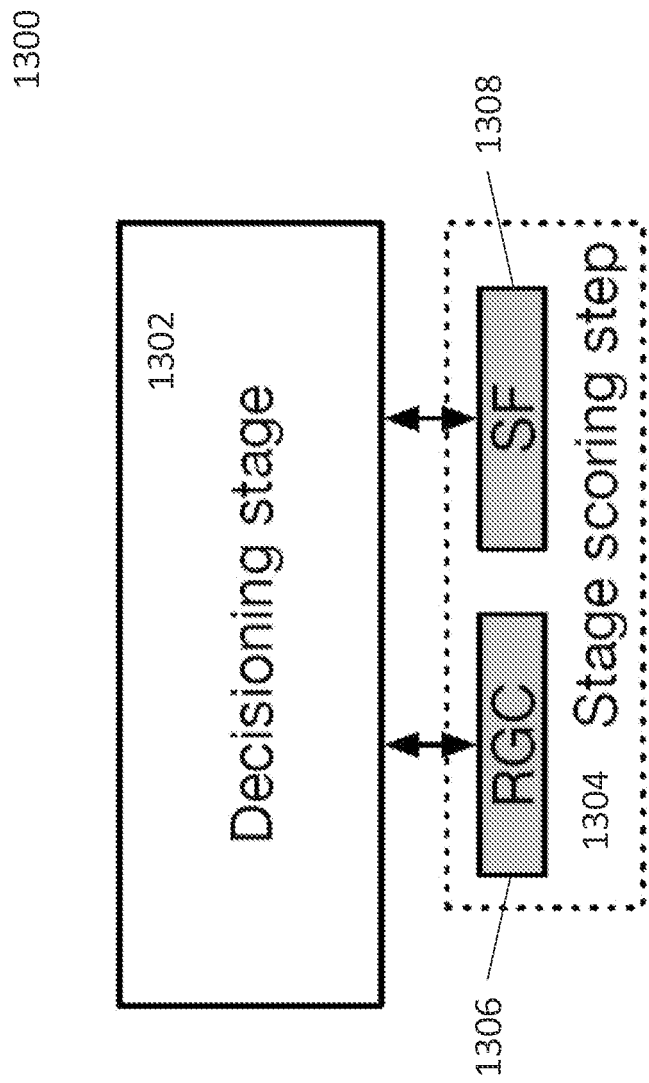
FIG. 13 shows an example embodiment of a scoring step decomposition into two segments in accordance with the present invention.

FIG. 13 shows an example embodiment of scoring step decomposition 1300 into two segments. In an example embodiment it can be a computation which is used between parsers and metadata computation before completed rows are created (e.g. as 504, 508, 516 in FIG. 5 or 604, 608, 616 in FIG. 6). In many embodiments, scoring functions can be naturally decomposed into two segments. In the example embodiment, a decisioning stage 1302 is in communication with a stage scoring step 1304. Stage scoring step 1304 can include a first segment 1308 and a second segment 1306. First segment 1308 can be a relatively quickly changing or evolving segment which can be constructed on rapidly-changing and novel information, e.g. the scoring function (SF). A second segment 1306 can be a more slowly varying segment which performs initial analysis and processing of data to generate single or individual inputs that reflect signals drawn directly from input data and metavariables computed from the data, the row generating client (RGC).

The decisioning stage 1302 can be viewed as depending on a distinguished 'stage scoring step" 1304, which, in turn, can include a row generation step, embodied by a row generating client (RGC) and a scoring function (SF). The RGC can correspond to the composition of the Parsers 504 and the Metadata computation 508 in FIG. 5 or the similarly named Parsers 604 and Metadata construction 608 in FIG. 6. The SF step 1308 corresponds to the Scoring function step 518 in FIG. 5 or the Scoring function step 618 in FIG. 6.

Figure 14A:
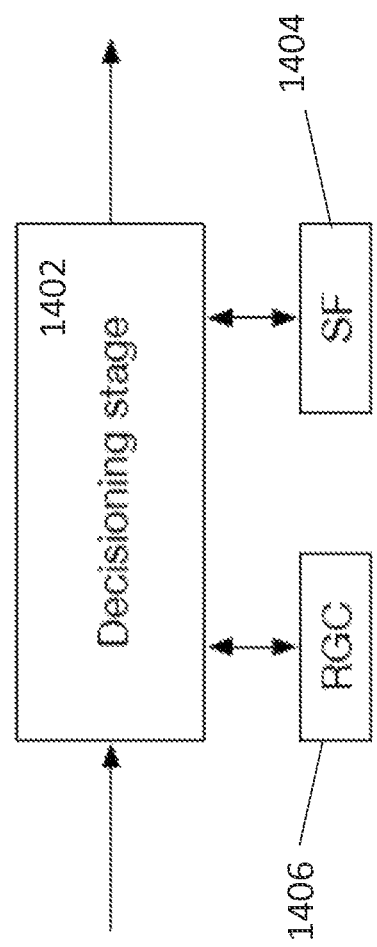
FIG. 14A shows an example embodiment of incorporating a scoring step into a decisioning stage in accordance with the present invention.
Figure 14B:
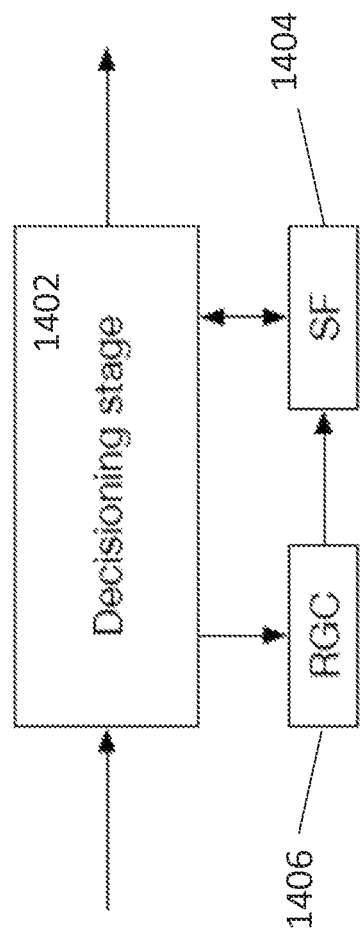
FIG. 14B shows an example embodiment of incorporating a scoring step into a decisioning stage in accordance with the present invention.

FIGS. 14A-14B show example embodiments of how scoring steps can be incorporated into a decisioning stage 1402. As shown in FIG. 14A, a process 1400 by which data flows through a decisioning stage 1402 can be mediated by code implementing the decisioning stage 1402 itself. In the example embodiment, RGC 1406 can be invoked from the decisioning stage 1402 and return at least one row directly to decisioning stage 1402. This row can then be passed on to scoring function 1404 from which a score can be calculated. This embodiment has the advantage that the output of an RGC 1406 can be stored or modified prior to the SF 1404. As shown in FIG. 14B, a call to a SF 1404 can be performed without returning an output of a RGC 1406 to decisioning stage 1402. In the example embodiment, decisioning stage 1420 can invoke RGC 1406 as in FIG. 14A, but the result from RGC 1406 is not passed to decisioning stage 1402. Instead, the newly constructed row is passed directly to SF 1404 without any intermediation by decisioning stage 1402. This can require that RGC 1406 and SF 1404 are running in a module which can preserve states, as discussed elsewhere herein. This can provide advantages including minimizing an amount of cross-process communication between the components of the scoring tool and the main decisioning process module.

Figure 15A:
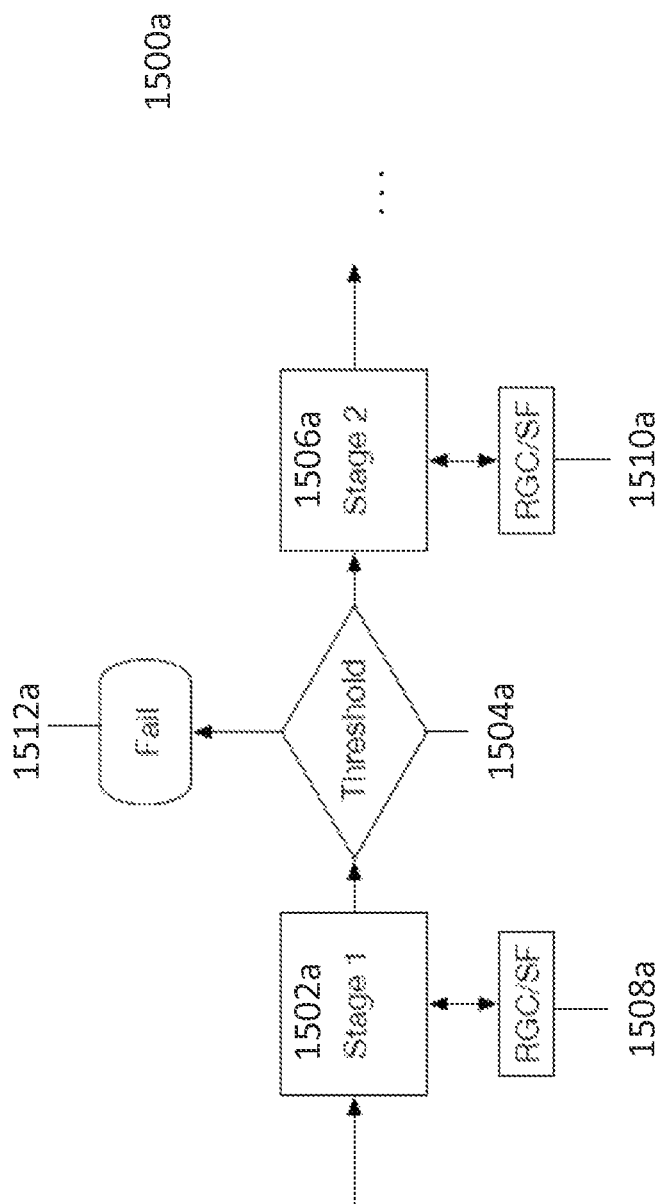
FIGS. 15A-15D show an example embodiments of multi-stage scoring architectures using waterfall scoring processes in accordance with the present invention.

FIGS. 15A-D show example embodiments of multi-stage scoring architectures using waterfall scoring processes 1500a-1500d. As shown in FIG. 15A, a first, straightforward waterfall scoring process 1500a can include two stages, Stage1 1502a and Stage2 1506a. In Stage1 1502a of the waterfall scoring process, incoming data can be exchanged with RGC/SF 1508a and yield an initial score which is then compared to a threshold 1504a or other acceptance step, which can be a binary threshold of yes or no. If that acceptance step fails as failure 1512a, then the scored object can be rejected and the process terminated. If the acceptance step of comparing to a threshold 1504a succeeds, then the process can be repeated in Stage2 1506a by exchanging data with RGS/SF 1510a and using a subsequent acceptance criterion (not shown), which can be different than the first. This kind of waterfall system can be repeated indefinitely as indicated by the ellipses after the output of Stage2 1506a.

Figure 15B:
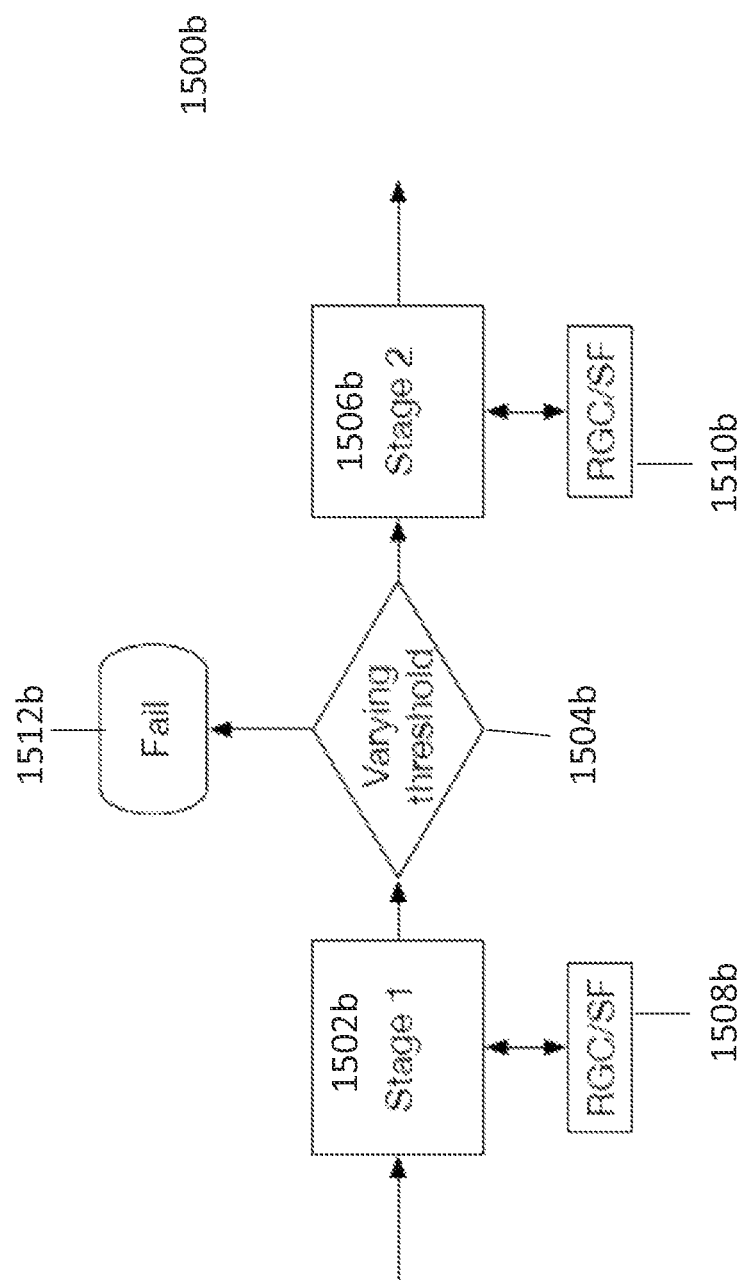

FIG. 15B shows a second, alternate embodiment of a waterfall scoring process 1500b in which the decision is not yes or no, but multi-level. As such, this embodiment operates in a similar fashion to that for process 1500a but a varying threshold 1504b is used. Embodiments of process 1500b thus permit a lender or other operator to compare the response rates for different applicants to different proposed loans terms (terms testing).

Figure 15C:
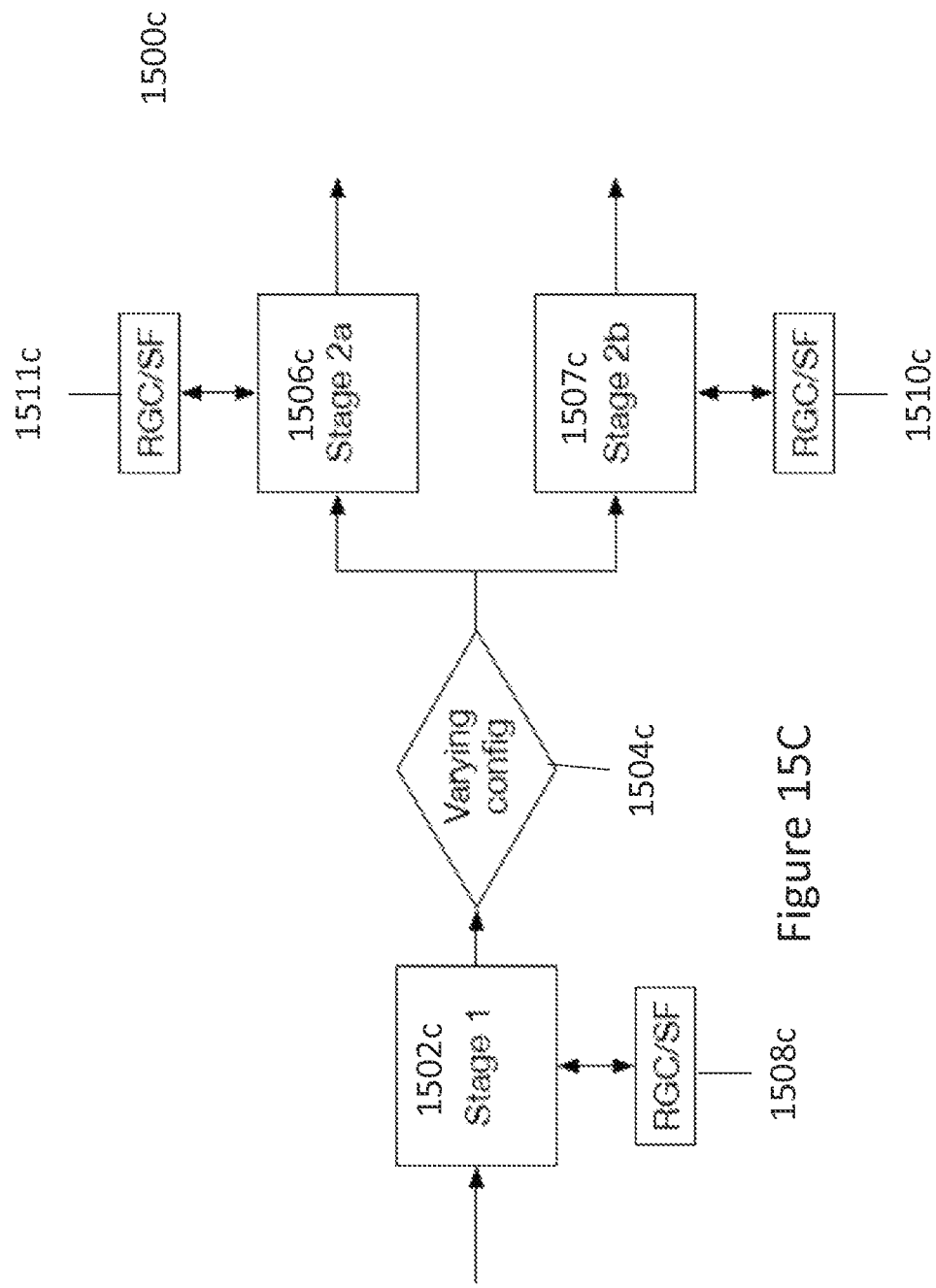

FIG. 15C shows a third, alternate embodiment of a waterfall scoring process 1500c in which different pathways are chosen based on input configuration. This version can support path testing or other forms of A/B testing. In Stage1 1502c of the waterfall scoring process 1500c, incoming data can be exchanged with RGC/SF 1508c and yield an initial score which is then processed by Varying configuration 1504c. Varying configuration 1504c can return one of two different values depending on whether the initial score was above or below a certain value or threshold. Based on the output of Varying configuration 1504c, a data gathering and processing pathway can follow a path to either Stage2a 1506c or Stage2b 1507c and in some embodiments, both. If Stage2a 1506c is taken, data can be exchanged with RGS/SF 1511c to generate output data. If Stage2b 1507c is taken, data can be exchanged with RGS/SF 1510c to generate output data.

Figure 15D:
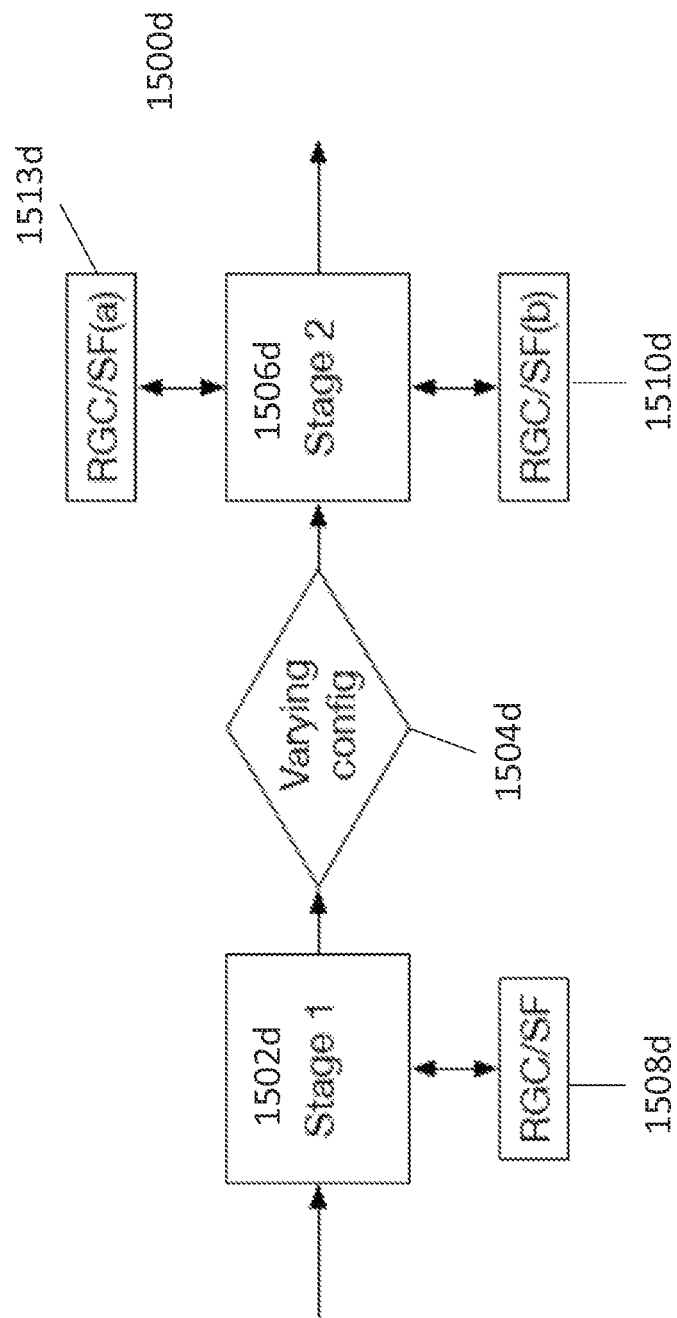

FIG. 15D shows a fourth, alternate embodiment of a waterfall scoring process 1500d in which different scoring regimens are applied based on configuration. This architecture can support percentage-wise testing in some embodiments and permit gradual transitions from one regiment to another. Percentage-wise testing can be used when one system, such as a new scoring function, needs to replace a different system, such as an old scoring function. It is often the case that the new system needs to be tested in production before it is deployed, but the risk of shifting completely from the old to the new is too high to be accepted. In that case, the new element is tested by using it in some percentage of cases before it is deployed in general. In addition, the new element can be brought into production incrementally thereafter, realizing a gradual transition from an old system to a new system. In Stage1 1502d of the waterfall scoring process 1500d, incoming data can be exchanged with RGC/SF 1508d and yield an initial score which can then be processed by Varying configuration 1504d. Using that score, Stage2 1506d can select one or another of SF(a) or SF(b) to score the application, and score that data with RGS/SF(a) 1513d or RGC/SF(b) 1510d as appropriate to generate output data.

Figure 16A:
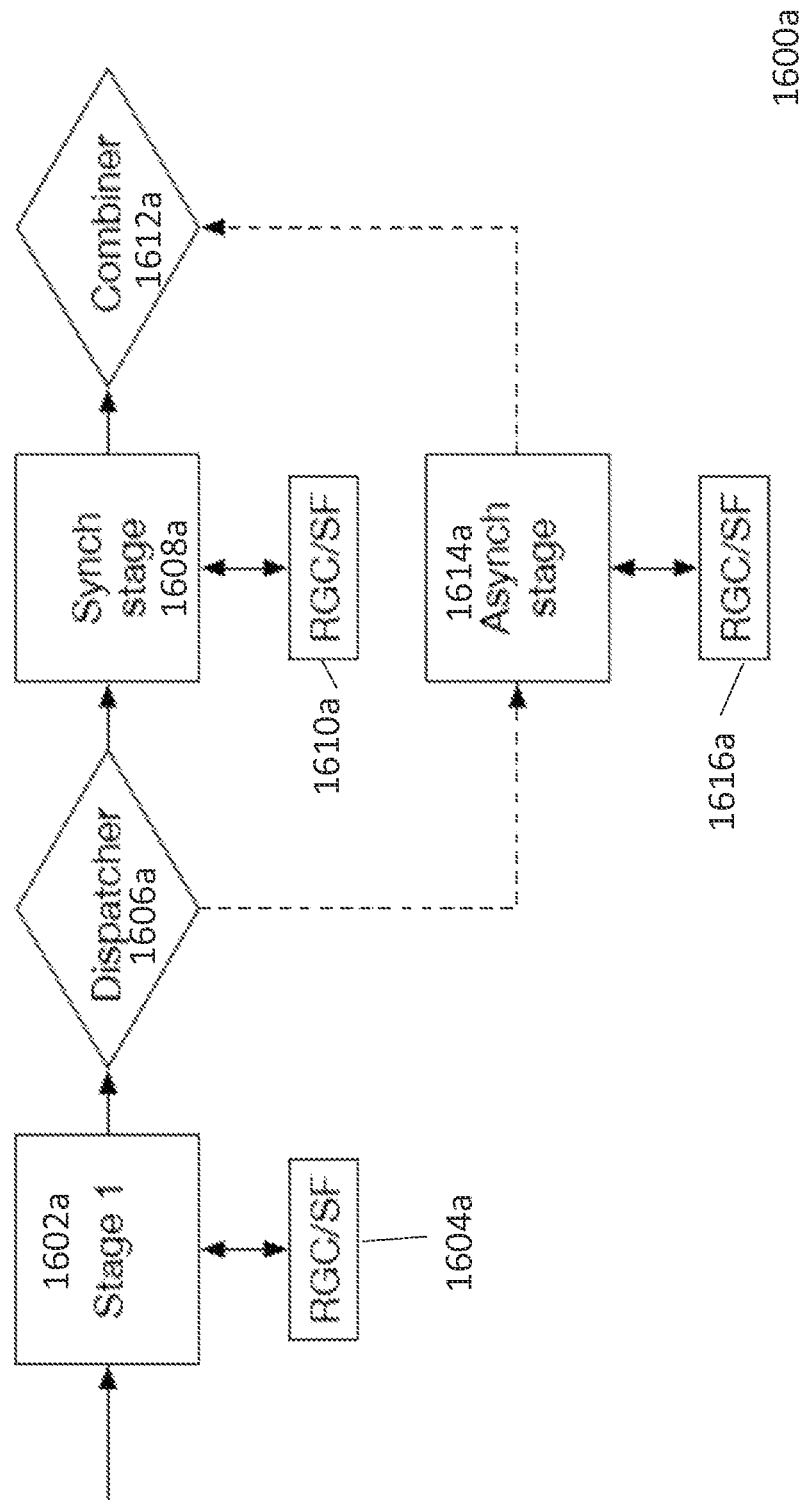
FIGS. 16A-16B show example embodiments of asynchronous steps in combination with waterfall scoring systems in accordance with the present invention.
Figure 16B:
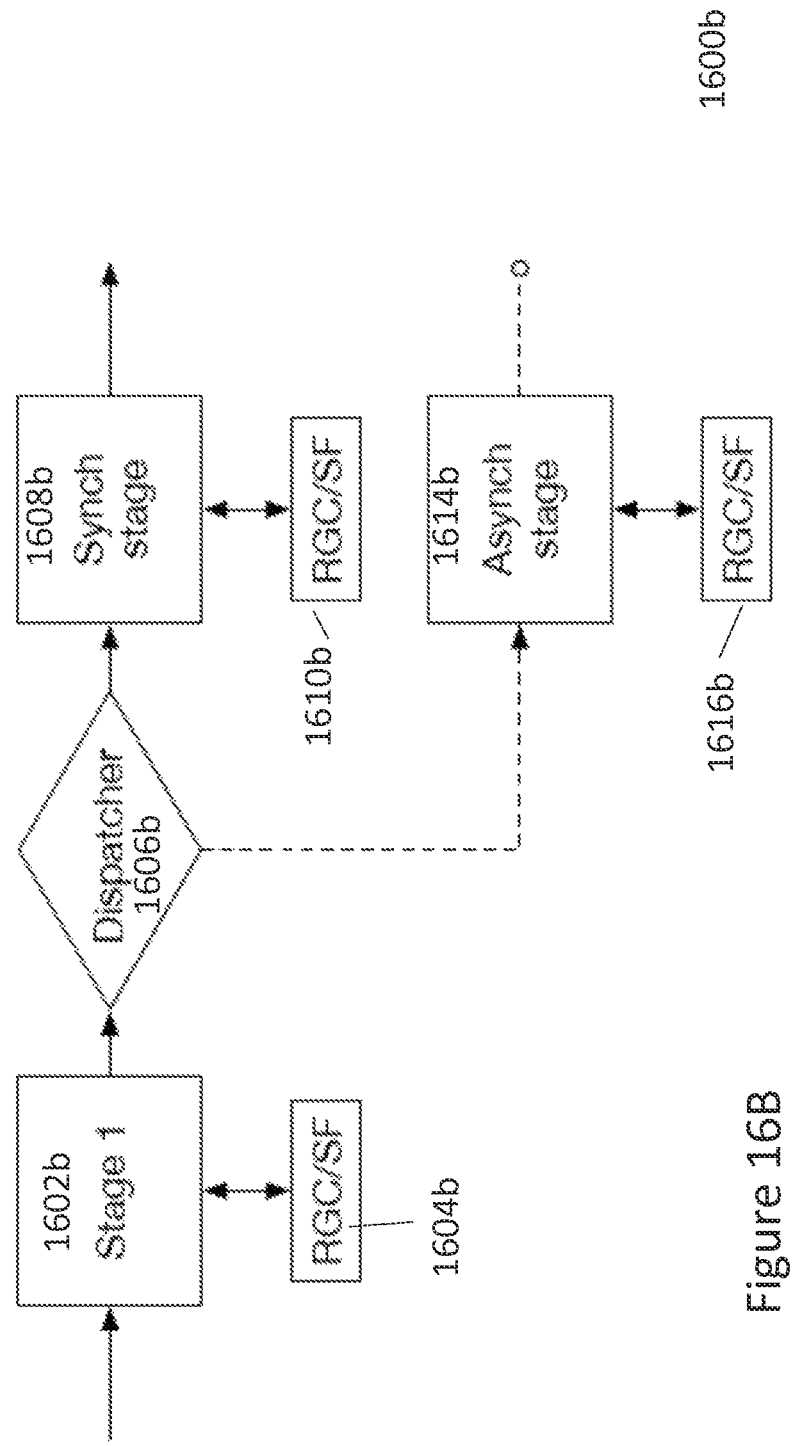

FIGS. 16A-B show example embodiments of asynchronous steps in combination with waterfall scoring systems 1600a and 1600b. As shown in FIG. 16A, in Stage1 1602a of the waterfall scoring process 1600a, incoming data can be exchanged with RGC/SF 1604a and yield an initial score which is sent to a Dispatcher 1606a. Dispatcher 1606a can be a module which accepts scores and applications and then dispatches them to subsequent stages. In an example embodiment, Dispatcher 1606a can then transmit data to Synchronous stage 1608a or Asynchronous stage 1614a based on an initial score. A Synchronous stage 1608a can receive data from Dispatcher 1606a and compute a score by exchanging data with RGS/SF 1610a before transmitting the score as an output to Combiner 1612a. When data are scored through Synchronous stage 1608a, the system which will handle the returned score may not progress until a score is returned. An asynchronous scoring step can be launched indicated by the dotted line path from Dispatcher 1606a through Asynchronous stage 1614a to Combiner 1612a. When data are scored through Asychronous stage 1614a, the system which will handle the returned score can continue without interruption. In the asynchronous path, a score can be computed in a separate location at Asynchronous stage 1614a by exchanging data with RGS/SF 1616a and that computed score can then be returned to a main pipeline via a callback or other kind of inter-thread synchronization process by Combiner 1612a. Process 1600a can be particularly valuable during tests of the same type as percentage tests, except that instead of scoring a fraction of all applications through a new scoring function, all applications can be scored along a separate pathway which does not interact with the old scoring system in use. This type of process can be used before percentage testing to show that a given new scoring function is stable enough to be used in production in a very low risk fashion: if an asynchronous invocation fails, then the application will still be scored, but the instability won't affect the main pathway. In that case, a decision to an applicant through process 1600*a* can depend on an old scoring regimen, while the new scores can be computed for testing purposes.

As shown in an example embodiment in FIG. 16B, an asynchronous scoring step of an alternate waterfall scoring process 1600*a* can be launched if a given step in an original (non-alternate) waterfall expects no response. Similar to the waterfall process in 1600*a*, in waterfall process 1600*b*, Stage1 1602*b* of waterfall scoring process 1600*b*, incoming data can be exchanged with RGC/SF 1604*b* and yield an initial score which is sent to a Dispatcher 1606*b*. Dispatcher 1606*b* can be a module which accepts scores and applications and then dispatches them to subsequent stages. In the example embodiment, Dispatcher 1606*a* can transmit data to Synchronous stage 1608*b* or Asynchronous stage 1610*b* based on an initial score which can be compared to a threshold or otherwise judged by the module. A Synchronous stage 1608*b* can receive data from Dispatcher 1606*b* and compute a score by exchanging data with RGS/SF 1610*b* before returning that score to the main on-line process, which can wait for the score to be returned before making any further progress. However, unlike in waterfall scoring process 1600*a*, in the asynchronous case shown in waterfall scoring process 1600*b*, an extra step in which asynchronous and synchronous outputs are resynchronized is never performed. Therefore, no Combiner element is needed. As such, the asynchronous output of the asynchronous step signified from the Dispatcher 1606*b* through Asynchronous stage 1614*b* and transmitted or stored as an output after exchanging data with RGS/SF 1616*b* is merely allowed to run to completion. The waterfall scoring process 1600*b* can be appropriate when an asynchronous step generates an artifact, whether that artifact is a score, an object such as a letter, or any other entity which is not used by the main waterfall. An example embodiment can occur in a case when the construction of an adverse action letter is complete, and the letter is ready for transmission to the applicant.

Any of the above-described processes and methods may be implemented by any now or hereafter known computing device. For example, the methods may be implemented in such a device via computer-readable instructions embodied in a computer-readable medium such as a computer memory, computer storage device or carrier signal. Similarly, storage, storing, or other necessary functions such as processing can be implemented by operative devices including processors and non-transitory computer-readable media.

The preceding described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

What is claimed is:

1. A non-transitory computer-readable storage medium storing executable computer program instructions that, when executed by a computing system, cause the computing system to perform a method comprising:
receiving a first request from a client device;
constructing a first scoreable object by processing information from the first request and accessed additional information;
determining a first unique identifier in association with the first scoreable object;
providing the first unique identifier to the client device; and
receiving a second request from the client device that specifies the first unique identifier and, in response:
controlling a scoring kernel to generate a first score for the first scoreable object, and
providing the first score to the client device.

2. The non-transitory computer-readable storage medium of claim 1, wherein the computing system comprises an application programming interface (API) client layer.

3. The non-transitory computer-readable storage medium of claim 1, wherein the first request is received via a web server system.

4. The non-transitory computer-readable storage medium of claim 3, wherein the web server system is configured to provide the client device with a user interface constructed to generate the first request.

5. The non-transitory computer-readable storage medium of claim 1, wherein the processing instructions comprise Domain Specific Language (DSL) instructions, wherein the scoring kernel generates the first score by processing General Purpose Language (GPL) instructions.

6. The non-transitory computer-readable storage medium of claim 5, wherein the scoring kernel is configured to be updated by modification of the GPL instructions without modification to the DSL instructions.

7. The non-transitory computer-readable storage medium of claim 1, wherein the client device compares the first score to a predetermined threshold to determine whether the first score is accepted.

8. The non-transitory computer-readable storage medium of claim 1, wherein the accessed information comprises regional econometric data and regional demographic data.

9. The non-transitory computer-readable storage medium of claim 8, wherein the client device is configured to compare the first score to a threshold to determine whether the first score is accepted, wherein the threshold is based on the regional econometric data.

10. The non-transitory computer-readable storage medium of claim 1, wherein the first request specifies the scoring kernel.

11. The non-transitory computer-readable storage medium of claim 1, wherein the first request comprises a first set of metavariables, wherein constructing the first scoreable object comprises enriching the first set of metavariables with a second set of variables associated with the accessed additional information and a third set of metavariables determined based on both the first and second sets.

12. The non-transitory computer-readable storage medium of claim 11, wherein constructing the first scoreable object further comprises filtering out metavariables from each of the first, second, and third sets.

13. A method comprising, at an application programming interface (API) client layer:
receiving a first request from a web server system, the first request associated with a client device;
constructing a scoreable object based on the first request and accessed additional information;
determining a unique identifier in association with the scoreable object;
providing the unique identifier to the web server system; and
receiving a second request from the web server system that specifies the unique identifier and, in response:

controlling a first scoring kernel to generate a first score for the scoreable object, and providing the first score to the web server system.

14. The method of claim 13, further comprising: selecting the first scoring kernel from a plurality of scoring kernels based on the first scoreable object.

15. The method of claim 13, further comprising: controlling a second scoring kernel to generate a second score for the first scoreable object, and comparing the first and second scores.

16. The method of claim 15, wherein comparing the first and second scores comprises validating the first score based on the second score before providing the first score to the web server system.

17. The method of claim 13, wherein the processing instructions comprise Domain Specific Language (DSL), wherein the scoring kernel generates the first score by processing General Purpose Language (GPL) instructions.

18. The method of claim 17, wherein the scoring kernel is configured to be updated by modification of the GPL instructions without modification to the DSL instructions.

19. The method of claim 13, the method further comprising:

storing the scoreable object in association with the unique identifier;

storing the first score in association with the scoreable object; and training a second scoring kernel based on the first score and first scoreable object.

20. The method of claim 19, further comprising: responsive to a third request received via the web server system and that specifies the first unique identifier, accessing the scoreable object from storage;

controlling the second scoring kernel to create a second score for the scoreable object; and providing the second score to the web server system.

* * * * *